(12) United States Patent
Malkiel et al.

(10) Patent No.: US 11,868,723 B2
(45) Date of Patent: Jan. 9, 2024

(54) INTERPRETING TEXT-BASED SIMILARITY

(71) Applicant: Microsoft Technology Licensing, LLC, Redmond, WA (US)

(72) Inventors: Itzik Malkiel, Givaatayim (IL); Noam Koenigstein, Tel Aviv (IL); Oren Barkan, Tel Aviv (IL); Dvir Ginzburg, Tel Aviv (IL); Nir Nice, Salit (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 192 days.

(21) Appl. No.: 17/218,136

(22) Filed: Mar. 30, 2021

(65) Prior Publication Data

US 2022/0318504 A1 Oct. 6, 2022

(51) Int. Cl.
*G06F 40/284* (2020.01)
*G06F 16/9538* (2019.01)
*G06F 40/295* (2020.01)

(52) U.S. Cl.
CPC ........ *G06F 40/284* (2020.01); *G06F 16/9538* (2019.01); *G06F 40/295* (2020.01)

(58) Field of Classification Search
CPC .. G06F 40/284; G06F 16/9538; G06F 40/295; G06F 40/30; G06N 3/0454; G06N 3/08
See application file for complete search history.

(56) References Cited

U.S. PATENT DOCUMENTS 11,461,829 B1 * 10/2022 Wang ................. G06Q 30/0603
2008/0320549 A1 12/2008 Bertino et al.
(Continued)

FOREIGN PATENT DOCUMENTS

CN 111881334 A * 11/2020

OTHER PUBLICATIONS

Sun et al. (Sun, F., Liu, J., Wu, J., Pei, C., Lin, X., Ou, W., & Jiang, P. (Nov. 2019). BERT4Rec: Sequential recommendation with bidirectional encoder representations from transformer. In Proceedings of the 28th ACM international conference on information and knowledge management (pp. 1441-1450) (Year: 2019).*

(Continued)

*Primary Examiner* — Bhavesh M Mehta
*Assistant Examiner* — Philip H Lam
(74) *Attorney, Agent, or Firm* — Barta, Jones & Foley, PLLC

(57) ABSTRACT

The disclosure herein describes a system for interpreting text-based similarity between a seed item and a recommended item selected by a pre-trained language model from a plurality of candidate items based on semantic similarities between the seed item and the recommended item. The system analyzes similarity scores and contextual paragraph representations representing text-based descriptions of the seed item and recommended item to generate gradient maps and word scores representing the text-based descriptions. A model for interpreting text-based similarity utilizes the calculated gradients and word scores to match words from the seed item description with words in the recommended item description having similar semantic meaning. The word-pairs having the highest weight are identified by the system as the word-pairs having the greatest influence over the selection of the recommended item from the candidate items by the original pre-trained language model.

20 Claims, 14 Drawing Sheets

(56) References Cited

U.S. PATENT DOCUMENTS

| | | | |
|---|---|---|---|
| 2017/0060993 A1* | 3/2017 | Pendar | G06F 16/334 |
| 2017/0186032 A1* | 6/2017 | Rangasamy Kannadasan | |
| | | | G06V 10/462 |
| 2017/0235824 A1* | 8/2017 | Liu | G06Q 40/00 |
| | | | 707/723 |
| 2019/0251707 A1* | 8/2019 | Gupta | G06T 9/002 |
| 2019/0370323 A1* | 12/2019 | Davidson | G10L 15/26 |
| 2021/0109958 A1* | 4/2021 | Behtash | G06F 18/214 |
| 2021/0182935 A1 | 6/2021 | Malkiel et al. | |
| 2022/0093088 A1* | 3/2022 | Rangarajan Sridhar | |
| | | | G06F 16/338 |
| 2022/0261428 A1* | 8/2022 | Osuala | G06F 16/338 |

OTHER PUBLICATIONS

Yang et al. (Yang, X., He, X., Zhang, H., Ma, Y., Bian, J., & Wu, Y. (2020). Measurement of semantic textual similarity in clinical texts: comparison of transformer-based models. JMIR medical informatics, 8(11), e19735.) (Year: 2020).*

Begum et al. (Begum, S., Ahmed, M. U., Funk, P., Xiong, N., & Schéele, B. (2007). Similarity of medical cases in health care using cosine similarity and ontology. In ICCBR (pp. 263-272).) (Year: 2007).*

Kenter, T., & De Rijke, M. (Oct. 2015). Short text similarity with word embeddings. In Proceedings of the 24th ACM international on conference on information and knowledge management (pp. 1411-1420). (Year: 2015).*

"International Search Report and Written Opinion Issued in PCT Application No. PCT/US2020/059906", dated Feb. 25, 2021, 12 Pages.

"Notice of Allowance Issued in U.S. Appl. No. 16/789,381", dated Oct. 14, 2021, 9 Pages.

Versloot, Christian, "Easy Masked Language Modeling with Machine Learning and HuggingFace Transformers", Retrieved from: https://www.machinecurve.com/index.php/2021/03/02/easy-masked-language-modeling-with-machine-learning-and-huggingface-transformers/, Mar. 2, 2021, 20 Pages.

"Non Final Office Action Issued in U.S. Appl. No. 16/789,381", dated Jun. 25, 2021, 16 Pages.

Adebayo, et al., "Sanity checks for saliency maps", In Proceedings of 32nd Conference on Neural Information Processing Systems, Dec. 3, 2018, pp. 1-11.

Arya, et al., "One Explanation Does Not Fit All: A Toolkit and Taxonomy of AI Explainability Techniques", In Repository of arXiv:1909.03012v2, Sep. 14, 2019, pp. 1-18.

Barocas, et al., "The hidden assumptions behind counterfactual explanations and principal reasons", In Proceedings of the Conference on Fairness, Accountability, and Transparency, Jan. 27, 2020, pp. 80-89.

Comaniciu, et al., "Mean Shift: A Robust Approach Toward Feature Space Analysis", In Journal of IEEE Transactions on Pattern Analysis and Machine Intelligence, vol. 24, Issue 5, May 2002, pp. 603-619.

Devlin, et al., "Bert: Pre-Training of Deep Bidirectional Transformers for Language Understanding", In Repository of arXiv: 1810.04805, May 24, 2019, 16 Pages.

Doshi-Velez, et al., "Towards a rigorous science of interpretable machine learning", In Repository of arXiv: 1702.08608v2, Mar. 2, 2017, pp. 1-13.

Ebrahimi, et al., "Hotflip: White-box adversarial examples for text classification", In Repository of arXiv: 1712.06751v2, May 24, 2018, 6 pages.

Gilpin, et al., "Explaining explanations: An overview of interpretability of machine learning", In Proceedings of IEEE 5th International Conference on data science and advanced analytics (DSAA), Oct. 1, 2018, pp. 80-89.

Goodman, et al., "Eu regulations on algorithmic decision-making and a right to explanation", In ICML workshop on human interpretability in machine learning, Jun. 2016, pp. 26-30.

Gururangan, et al., "Don't stop pretraining: Adapt language models to domains and tasks", In Repository of arXiv:2004.10964v3, May 5, 2020, 19 Pages.

Hoover, et al., "exbert: A visual analysis tool to explore learned representations in transformers models", In Repository of arXiv:1910.05276v1, Oct. 11, 2019, pp. 1-8.

Kulesza, et al., "Explanatory debugging: Supporting enduser debugging of machine-learned programs", In Proceedings of IEEE Symposium on Visual Languages and Human-Centric Computing,, Sep. 21, 2010, pp. 41-48.

Lei, et al., "Rationalizing neural predictions", In Proceedings of the Conference on Empirical Methods in Natural Language Processing, Nov. 2016, pp. 107-117.

Liu, et al., "Roberta: A Robustly Optimized BERT Pretraining Approach", In Repository of arXiv:1907.11692, Jul. 26, 2019, 13 Pages.

Malkiel, et al., "Recobert: A catalog language model for text-based recommendations", In Repository of arXiv:2009.13292v1, Sep. 25, 2020, 12 pages.

Mikolov, et al., "Distributed Representations of Words and Phrases and their Compositionality", In Proceedings of 27th Annual Conference on Neural Information Processing Systems, Dec. 5, 2013, pp. 1-9.

Ribeiro, et al., "Why Should I Trust You?": Explaining the Predictions of Any Classifier, In Proceedings of the 22nd ACM SIGKDD International Conference on Knowledge Discovery and Data Mining, Aug. 2016, pp. 1135-1144.

Selbst, et al., "Meaningful Information and the Right to Explanation", In Proceedings of the 1st Conference on Fairness, Accountability and Transparency, vol. 81, 2018, 1 Page.

Selbst, et al., "The intuitive appeal of explainable machines", In Fordham Law Review, vol. 87, Issue 3, 2018, pp. 1085-1139.

Selvaraju, et al., "Grad-cam: Visual explanations from deep networks via gradient-based localization", In International Journal of Computer Vision, vol. 128, Oct. 11, 2019, 9 Pages.

Springenberg, et al., "Striving for simplicity: The all convolutional net", In Proceedings of 3rd International Conference on Learning Representations, May 7, 2015, pp. 1-14.

Vaswani, et al., "Attention Is All You Need", In Publication of arXiv:1706.03762v5 [cs.CL], Dec. 6, 2017, 15 Pages.

Wallace, et al., "AllenNLP Interpret: A Framework for Explaining Predictions of NLP Models", In Journal of Computing Research Repository, Sep. 19, 2019, 6 Pages.

Wu, et al., "Google's neural machine translation system: Bridging the gap between human and machine translation.", In Repository of arXiv:1609.08144v2, Oct. 8, 2016, pp. 1-23.

Xu, et al., "Bert post-training for review reading comprehension and aspect-based sentiment analysis", In Repository of arXiv:1904.02232v2, May 4, 2019, 12 pages.

Yang, et al., "XInet: Generalized autoregressive pretraining for language understanding", In Repository of arXiv:1906.08237v2, Jan. 2, 2020, pp. 1-18.

Yosinski, et al., "Understanding neural networks through deep visualization", In Repository of arXiv:1506.06579v1, Jun. 22, 2015, pp. 1-12.

Zeiler, et al., "Visualizing and understanding convolutional networks", In Proceedings of European Conference on Computer Vision, Sep. 6, 2014, pp. 818-833.

Zeiler, et al., "Adaptive Deconvolutional Networks for Mid and High Level Feature Learning", In Proceedings of the International Conference on Computer Vision, Nov. 2011, pp. 2018-2025.

Zhao, et al., "Generating natural adversarial examples", In Repository of arXiv:1710.11342v2, Feb. 23, 2018, pp. 1-15.

Zhou, et al., "Learning deep features for discriminative localization", In Repository of arXiv:1512.04150v1, Dec. 14, 2015, pp. 1-10.

Joshi, et al., "Extending a Parser to Distant Domains Using a Few Dozen Partially Annotated Examples", In Proceedings of the 56th Annual Meeting of the Association for Computational Linguistic, Jul. 15, 2018, 10 Pages.

"Constituency Parsing", Retrieved from: https://demo.allennlp.org/constituency-parsing/MTM2MzQyMQ, d Date: Oct. 11, 2019, 1 Page.

(56) References Cited

OTHER PUBLICATIONS

Barkan, et al., "GAM: Explainable Visual Similarity and Classification via Gradient Activation Maps", In repository of arxiv code: 2109.00951, Sep. 2, 2021, 13 Pages.

Barkan, et al., "Grad-SAM: Explaining Transformers via Gradient Self-Attention Maps", In Proceedings of the 30th ACM International Conference on Information & Knowledge Management, Nov. 5, 2021, pp. 2882-2887.

"International Search Report and Written Opinion Issued in PCT Application No. PCT/US22/019218", dated May 18, 2022, 9 Pages.

\* cited by examiner

Algorithm 1 ITBS algorithm. The MeanShift function returns the cluster index for each sample. The clusters are sorted in descending order w.r.t. to their centroids (i.e. the top-performing cluster receives the index 0). Params: $top\_k = 2$, $p_1, p_2 \in P$.

function MATCHWORDS($w^1, \widehat{w^2}, w^1_s, w^2_s, w^1, w^2$, reversed)
  $M := \emptyset$
  for $1 \leq i \leq |\widehat{w^1}|$ do
    $m, c \leftarrow 1, C(\widehat{w^1_i}, \widehat{w^2_1})$
    for $2 \leq j \leq |\widehat{w^2}|$ do
      $\hat{c} \leftarrow C(\widehat{w^1_i}, \widehat{w^2_j})$
      if $c \leq \hat{c}$ $m, c \leftarrow j, \hat{c}$
    end for
    if reversed then
      $M \leftarrow M \cup \{((w^2_m, w^1_i), (w^2_s)_i \cdot (w^1_s)_m \cdot c)\}$
    else
      $M \leftarrow M \cup \{((w^1_i, w^2_m), (w^1_s)_i \cdot (w^2_s)_m \cdot c)\}$
    end if
  end for
  return $M$
end function function $F_p(p)$
  $F_p \leftarrow \frac{1}{|p|} \sum_{i=2}^{|p|+1} B(p)_i$
  return $F_p$
end function function TOKENSALIENCY($p_1, p_2$)
  $g \leftarrow \frac{\partial C(F_{p_1}, F_{p_2})}{\partial E(p_2)}$
  $s \leftarrow [\sum_{k=1}^{h} \phi(E(p_2)_i \circ (g_i))]_{i=1}^{|p_2|}$
  $s \leftarrow \min\text{-}\max(s)$
  return $s$
end function function TOPWORDS($m^1, m^2, top\_k$)
  $M \leftarrow m^1 \cup m^2$
  $M^* \leftarrow ((M_j)_2)_{j=1}^{|M|}$ ▷ word-pair scores
  $S := (\varsigma_i)_{k=1}^{|m^1|+|m^2|} \leftarrow \text{MeanShift}(M^*)$ ▷ the cluster index for each sample
  $T := \emptyset$
  for $1 \leq i \leq |M|$ do
    $T \leftarrow T \cup \{M_i\}$, if $S_i \leq topC$
  end for
  return $T$
end function 1: $s^1 := (s^1_j)_{j=1}^{m} \leftarrow \text{TokenSaliency}(p_2, p_1)$
2: $s^2 := (s^2_j)_{j=1}^{m} \leftarrow \text{TokenSaliency}(p_1, p_2)$
3: $w^1, \widehat{w^1}, w^1_s \leftarrow \text{WordPiece}^{-1}(p_1, B(p_1), s^1)$
4: $w^2, \widehat{w^2}, w^2_s \leftarrow \text{WordPiece}^{-1}(p_2, B(p_2), s^2)$
5: $m^1 \leftarrow \text{MatchWords}(w^1, \widehat{w^2}, w^1_s, w^2_s, w^1, w^2, \text{False})$
6: $m^2 \leftarrow \text{MatchWords}(w^2, \widehat{w^1}, w^2_s, w^1_s, w^2, w^1, \text{True})$
7: return TopWords($m^1, m^2, top\_k$)

| | matched-words | Word similarity | Word-pair score |
|---|---|---|---|
| (0.88) (0.78) (0.38) Cardigan in lightweight sweatshirt fabric with visible seams and a jersey-lined, drawstring hood. Long sleeves, side pockets, and asymmetric hem with a raw, rolled edge. No fasteners. (1.0) | Cardigan, cardigan | (0.95) | (0.44) |
| | sweatshirt, sweatshirt | (0.19) | (0.96) |
| (0.25) (0.52) Long sweatshirt cardigan in lightweight cotton fabric with a hood and high stand-up collar. Diagonal zip at front, decorative seams at front and back, and side-seam pockets. (1.0) (0.38) | seams, seams | (0.76) | (0.11) |
| | asymmetric, Diagonal | (0.75) | (0.75) |

| | matched-words | Word similarity | Word-pair score |
|---|---|---|---|
| (0.81) Fine-knit gloves in soft fabric with ribbed cuffs. Tops of thumb, index, and middle fingers in touchscreen-compatible fabric. (1.0) | Gloves, Gloves | (0.98) | (0.25) |
| (0.31) Running gloves with uppers in windproof functional fabric. Wide ribbing at cuffs, printed reflective detail at top, and small key pocket at back of one glove with concealed zip. Top of thumb and index finger made from smartphone-friendly material. Unlined (1.0) | smartphone-friendly, touchscreen-compatible | (0.83) | (0.83) |

| | matched-words | Word similarity | Word-pair score |
|---|---|---|---|
| (0.29) (0.47) (1.0) Running shirt in fast-drying functional fabric with taped details. Back section in ventilating mesh and long raglan sleeves with thumbholes at cuffs. | Shirt, shirt | (0.95) | (0.30) |
| | Running, sports | (0.84) | (0.11) |
| (0.41) (0.67) (0.68) CONSCIOUS. Long-sleeved sports shirt in fast-drying, breathable functional fabric. Overlocked seams for improved comfort. Slim fit. Made partly from recycled polyester. | ventilating, breathable | (0.82) | (0.56) |

| | matched-words | Word similarity | Word-pair score |
|---|---|---|---|
| Straight-cut shirt in washed denim with a collar. Buttons at front, open chest pocket, and yoke at back with pleat. Long sleeves with buttons at cuffs. Rounded hem, (0.48) (0.78) (0.66) (0.55) slightly longer at back. | and, and | (0.98) | (0.352) |
| | cuffs, cuffs | (0.853) | (0.316) |
| Long-sleeved shirt in soft, washed cotton denim. Band collar, classic button placket, and adjustable buttoning at cuffs. Rounded hem. (0.74) (0.66) (0.33) | pleat, cuffs | (0.771) | (0.402) |
| | Rounded, Rounded | (0.791) | (0.148) |

| | matched-words | Word similarity | Word-pair score |
|---|---|---|---|
| (0.25) (1.0) Straight-cut shirt in washed denim with a collar. Buttons at front, open chest pocket, and yoke at back with pleat. Long sleeves with buttons at cuffs. Rounded hem, slightly longer at back. | shirt, shirt | (0.945) | (0.074) |
| (0.29) (1.0) Long-sleeved shirt in soft, washed cotton denim. Band collar, classic button placket, and adjustable buttoning at cuffs. Rounded hem. | denim, denim | (0.986) | (0.986) |

| The man is using a camera to hammer a nail. | matched-words | Word similarity | Word-pair score |
|---|---|---|---|
| Someone is banging a camera lens against a nail. | camera, camera<br>nail, nail | (1.0)<br>(1.0) | (0.332)<br>(0.158) |

| (0.45)  (0.32)  (0.22)<br>The man is using a camera to hammer a nail.<br>(0.32)  (0.36)  (0.29)<br>Someone is banging a camera lens against a nail. | matched-words | Word similarity | Word-pair score |
|---|---|---|---|
| | man, Someone<br>hammer, banging<br>camera, camera | (0.772)<br>(0.532)<br>(0.995) | (0.081)<br>(0.067)<br>(0.10) |

| The other 24 members are split between representatives of the securities industry and so-called "public" board members. | matched-words | Word similarity | Word-pair score |
|---|---|---|---|
| Of the 24 directors who are not exchange executives, half are representatives of the securities industry and half are designated public members. | members, who<br>between, exchange<br>so-called, members | (0.362)<br>(0.116)<br>(0.006) | (0.155)<br>(0.102)<br>(0.053) |

| (0.13)  (0.21)<br>The other 24 members are split between representatives of the securities industry and so-called "public" board members.<br>(0.08)<br>(0.11)                (0.21)<br>Of the 24 directors who are not exchange executives, half are representatives of the securities industry and half are designated public members.<br>(0.15) | matched-words | Word similarity | Word-pair score |
|---|---|---|---|
| | other, exchange executives<br>member, directors<br>so-called, designed | (0.323)<br>(0.552)<br>(0.15) | (0.011)<br>(0.014)<br>(0.006) |

*FIG. 12*

| Model | MOS |
|---|---|
| (i) BTI (last layer) | 2.6 |
| (ii) BTI (activations) | 2.4 |
| (iii) BTI (gradients) | 3.9 |
| BTI | 4.3 |

Ablation study results

INTERPRETING TEXT-BASED SIMILARITY

BACKGROUND

Recommendations systems are used for content discovery across different platforms and applications. Recommendations systems can be applied on various domains, including music, movies, product catalogs and more. Most recommendations systems rely on collaborative filtering, a method that utilizes information extracted from historical activities of different users. Where usage data is unavailable, recommendations systems remain challenging, and require extensive use of content understanding models to generate content-based recommendations. Recommendations systems can vary across different type of content, such as, but not limited to, audio, video, images, text and more. These systems typically utilize a trained machine learning (ML) model which analyzes the catalogs of items to make inferences or predictions regarding which items to recommend. Determining how a model generates a particular recommendation can be difficult and unreliable due to the nature of the relatively complex nature of ML model prediction algorithms used to generate the recommendations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some examples provide a system and method for interpreting similarities between unlabeled paragraph pairs inferred by a pre-trained language model. An interpreting text-based similarity (ITBS) model calculates a set of gradients. The gradients represent a first text-based paragraph describing a seed item and a second text-based paragraph describing a recommended item. The recommended item is an item predicted to be similar to the seed item. The set of gradients are calculated based on a cosine similarity function applied on a set of feature vectors. The set of feature vectors include a first feature vector representing the first text-based paragraph and a second feature vector representing the second text-based paragraph. The ITBS model generates contextualized embeddings representing the two input paragraphs by propagating each paragraph through the pre-trained language model. A similarity score measures an affinity between the first text-based paragraph and the second text-based paragraph. The ITBS model identifies a set of word-pairs based on the interpreted contextualized embeddings. A word-pair includes a word selected from the first text-based paragraph matched to a word selected from the second text-based paragraph having a similar semantic meaning. The word-pair in the set of word-pairs is based on a word-pair score. The word-pair score indicates a degree to which the word-pair influenced selection of the recommended item from a plurality of candidate items by the original pre-trained language model.

BRIEF DESCRIPTION OF THE DRAWINGS

The disclosed examples are described in detail below with reference to the accompanying drawing figures listed below:

FIG. 9 is an exemplary diagram illustrating an algorithm for interpreting text-based similarity in pre-trained language model recommendations.

FIG. 10 is an exemplary table illustrating results for explaining text-based item similarities in a fashion data set.

FIG. 11 is an exemplary table illustrating a table including representative results for the parameter randomization test applied on the ITBS model.

FIG. 12 is an exemplary table including match words with their word-pair scores.

FIG. 13 is an exemplary table including ablation study results for the ITBS model.

Corresponding reference characters indicate corresponding parts throughout the drawings.

DETAILED DESCRIPTION

Figure 1:
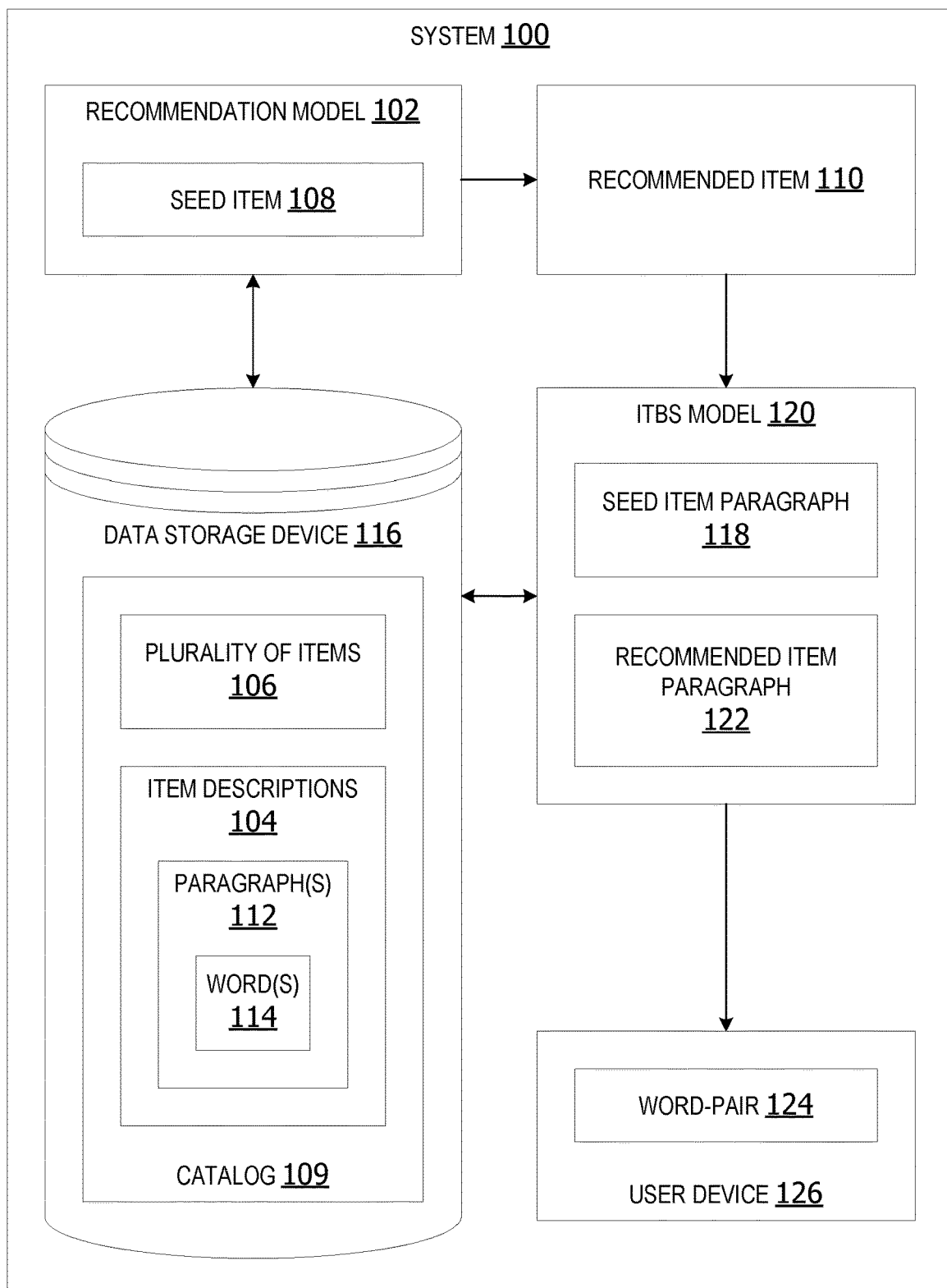
FIG. 1 is an exemplary block diagram illustrating a system for interpreting text-based similarity in recommendations generated by a pre-trained language model.

Textual content-based recommendation systems leverage textual information about items, such as item descriptions and titles. These models usually rely on Natural Language Processing (NLP) models to compute item-to-item similarities via items description. Recently, self-supervised pre-training of language models have revolutionized the field of NLP. Transformer-based models have revolutionized the field of natural language processing. Significant strides were made in tasks such as machine translation, sentiment analysis, natural language inference, semantic textual similarity, and item similarity. The increasing availability of artificial intelligence systems has brought about an increasing demand for methods to intuitively explain machine inference and predictions. However, these state-of-the-art language models, based on transformer architecture, employ hundreds of millions of parameters that cannot be decomposed into interpretable components. Hence, the interpretation of those models is still an open question.

Aspects of the disclosure provide a system for interpreting text-based similarities (ITBS) associated with recommendations generated by a pre-trained language model. In some examples, the ITBS model is a specialized language model trained using a domain-specific corpus to interpret text-based recommendations obtained by a well-trained language model. The system generates word-pairs which enable interpretation of recommendations generated by language models. The interpretation results can be used to reduce model prediction errors while improving user ability to understand how language models generate predictions and recommendations. This further improves user trust in the models and reliability of the model results.

Other aspects enable enhancing text-based recommendations using ITBS model results. The model analyzes item descriptions obtained from a textual catalog and a set of seed-candidate recommendations obtained by a textual content-based recommender system. The ITBS can be applied to the descriptions of each seed-candidate pair, retrieving the most important words that dictate the similarity between each element, for each pair. Given the retrieved most important words associated with their word-pairs scores, an additional score can be inferred for each seed-candidate pair, relying on a combination of the word-pair scores retrieved from ITBS for the given seed-candidate pair at hand. The word-pairs are utilized to interpret predictions made by the recommendation model.

ITBS can be applied to various natural language tasks, such as explaining text-based item recommendations. In the domain of recommendations, the interpretation (explanation) of model predictions reinforces user engagement and maximizes revenue. ITBS can also expedite research in the domain of language models by identifying failure modes in transformer-based language models, assessing the reliability of deployable language models, improving user trust in the underlying trained network, and analyzing the underlying dataset using the data interpreting the predictions made by trained language models.

The predictions generated by the ITBS model can further be utilized for a multiplicity of applications. Some application include increasing users' trust in recommendation and prediction generating systems. Other applications include improving model training, interpretability of predictions, as well as debugging.

In still other examples, the system utilizes intermediate representations extracted from a well-trained language model. The ITBS model obtains an accurate interpretation for the similarity between items, revealing the reasoning process behind the embedding mechanism of the underlying language model. Any use of other techniques for interpreting paragraphs similarities, that do not utilize the intermediate representations of the underlying model, would be independent of the model weights and therefore would not be able to reveal the underlying reasoning process obtained by the model. In contrast, the ITBS model provides reliable interpretations for text similarity which can be used for assessing the reliability of transformer-based models.

FIG. 1 is an exemplary block diagram illustrating a system 100 for interpreting text-based similarity of recommendations generated by a pre-trained language model. A recommendation model 102 analyzes text-based item descriptions 104 describing a plurality of items 106 within a catalog 109 of items to identify one or more items within the plurality of items 106 which are similar to a seed item 108.

The recommendation model 102, in some examples, is an untrained general language model or a pre-trained language model that is trained or fine-tuned using a domain-specific corpus to create a domain-specific, specialized trained language model. In other words, the recommendation model 102 is a pre-trained language model specialized to identify a recommended item 110 within the selected domain associated with the domain-specific corpus in response to a user-selection of a seed item 108. For example, if the seed item 108 is an item selected from a catalog of wines, the language model is pre-trained on a domain-specific corpus associated with wines or wine-related items, such that the model is pre-trained to understand text-based descriptions of wines.

The domain-specific corpus is used to change a general language model into a specialized model trained to make recommendations within a selected domain using one or more catalogs for that domain. For example, the word "dry" is typically interpreted as meaning the opposite of "wet." However, in the domain-specific area of wines, the word "dry" actually means the opposite of "sweet." Likewise, in the domain of wines, the color "red" is the opposite of "white". The model, in this non-limiting example, is trained in these domain-specific associations using the domain-specific corpus of training data associated with wines.

The seed item 108 is any item within the selected domain which has been selected or otherwise indicated by a user from a plurality of items within the selected domain. The seed item 108 is any item for used by the system to generate one or more recommended items based on similarity of candidate items with the seed item independent of the user and/or without any user-specific information.

The catalog 109 is a domain-specific information source for a given subject that contains a list of items (plurality of items) and textual information associated with each item. The textual information for each item in the catalog can include a title and/or a description. The textual item descriptions 104 can include paragraph(s) 112. The paragraph(s) 112 include sentences and word(s) 114.

A catalog 109 for a movie domain in one example, includes a list of movies. Each movie item includes a movie title and a description of the movie in one or more sentences or one or more paragraph. Likewise, a domain for wines, in another example, includes a list of wines. Each wine item in the catalog include a name of a wine and a description of the wine. The description of each item, in this non-limiting example, may include the color (red or white), the producer or vineyard from which the wine originated, year of bottling, or other descriptive information.

The system 100 can optionally include a data storage device 116 for storing data, such as, but not limited to the catalog 109. The data storage device 116 can include one or more different types of data storage devices, such as, for example, one or more rotating disks drives, one or more solid state drives (SSDs), and/or any other type of data storage device. The data storage device 116 in some non-limiting examples includes a redundant array of independent disks (RAID) array. In other examples, the data storage device 116 includes a database.

The data storage device 116 may be included within a computing device, attached to the computing device, plugged into the computing device, or otherwise associated with the computing device. In other examples, the data storage device 116 includes a remote data storage accessed by one or more computing devices via a network, such as a remote data storage device, a data storage in a remote data center, or a cloud storage.

In some examples, the recommendation model 102 is a pre-trained language model inferring item-to-item similarities by propagating all item descriptions for a set of candidate items through the recommendation model. For each item, the recommendation model extracts a feature vector. Then, given a seed item, the model calculates the cosine similarity between the feature vector of the given seed item and the feature vectors of all the other items in the dataset. The candidate item that maximizes the cosine similarity is retrieved as the most similar item. The most similar item is output as a recommended item predicted to be most similar to the seed item based on the unlabeled text-based descriptions for the items.

A seed item paragraph 118 describing the seed item 108 is input into an ITBS model 120. The ITBS model 120 is a machine learning model utilizing pattern recognition and feedback to interpret recommendation model 102 predictions. The ITBS model 120, in some examples, is implemented as an unsupervised pre-trained language model. The ITBS model 120 can include, without limitation, a bidirectional encoder representations from transformers (BERT), ELMo deep contextualized word representations, XLNET, ALBERT or any other natural language processing (NLP) context-based language model(s).

The ITBS model 120 executes on a computing device or a cloud server. The computing device can include any device executing computer-executable instructions (e.g., as application programs, operating system functionality, or both) to implement the operations and functionality associated with the ITBS model 120, such as, but not limited to, the computing device 1400 in FIG. 14 below. The computing device can be implemented as a mobile computing device or any other portable device. The computing device can also include less-portable devices such as servers, desktop personal computers, kiosks, or tabletop devices. Additionally, the computing device can represent a group of processing units or other computing devices. In some examples, the computing device has at least one processor and a memory.

The ITBS model 120 and/or the recommendation model 102 can also be implemented on a cloud server. A cloud server may be a logical server providing services to one or more computing devices or other clients. A cloud server may be hosted and/or delivered via a network for enabling communications with remote computing devices, such as, but not limited to, a local area network (LAN), a subnet, a wide area network (WAN), a wireless (Wi-Fi) network, the Internet, or any other type of network. A cloud server can be implemented on one or more physical servers in one or more data centers. In other examples, the cloud server may be associated with a distributed network of servers.

The ITBS model 120, in some examples, analyzes the seed item paragraph 118 to generate contextual representations of the words in the seed item paragraph 118. A recommended item paragraph 122 describing the recommended item 110 is input into the ITBS model 120. The ITBS model 120 generates contextual representations of the words based on domain-specific semantic meanings of the words in the seed item paragraph 118 and the recommended item paragraph 122. In other words, the system analyzes words in the descriptions to determine the meanings of words both based on common/ordinary meanings of the words, the domain-specific meanings of words, as well as meanings of the words based on context.

The domain-specific meaning of words refers to the special meanings of words given a specific domain. As discussed above, the word "dry" in the domain of wines refers to sweetness rather than the ordinary meaning which refers to lack of moisture. The context refers to the changing meaning of words based on other words in the description. For example, the word "bass" can refer to fish or to a low deep sound. The system learns to determine the meaning based on other words nearby. If the word "bass" is found near the word fishing pole, the system assumes it refers to a fish rather than a deep sound. Thus, the context and semantic meanings of each word are utilized to create a contextual representation representing each word.

The contextual representations are mathematical values, such as strings of variables, representing the words. A contextual representation is created for each word or portion of a word. The contextual representation is a sequence of numbers representing the meaning of each word. Semantic word representation models, such as BERT and ELMo, can utilize these contextual representations to perform operations on the representations, such as, but not limited to, matching word-pairs, scoring similarity and/or identifying word-pairs that are both similar and significant with regard to a generated recommendation or other prediction.

The ITBS model 120 analyzes the contextual representations to generate word-pairs. Each word-pair includes a word from the seed item paragraph 118 and a matching word from the recommended item paragraph 122. A contextual representation may also be referred to as a contextualized word embedding, word embeddings, and/or word vectors generated based on the feature vectors generated for each sentence in each paragraph within a description for a seed item and the recommended item. A matching word is a word which has the same or similar semantic meaning. In other words, both words in a word-pair are matched by the ITBS model as words having the same or similar meaning. This determination is performed using the contextual representations of each word. Words can be matched by comparing their similarity scores and/or word-pair scores indicating the degree of similarity of the meaning of the words within the domain-specific context of each sentence in which the word appeared.

The ITBS model explains the similarity between a seed item and a recommended item by marking pairs of important words, from both item descriptions, that dictate the similarity between them. The marked pairs can either comprise similar words or different words with a similar meaning. The ITBS model is able to interpret unlabeled text similarity inferred by transformer-based language models. ITBS produces interpretable explanations for the similarity of two textual paragraphs using the matched word-pairs.

In some examples, a word-pair 124 is selected by the ITBS model which has a word-pair score indicating the word-pair contributed to the recommendation model's decision to select the recommended item 110 from the plurality of items 106 as a predicted match with the seed item 108. A scoring component, such as the scoring component 316 in FIG. 3 below, generate the score. The scoring component is a software component performing one or more operations on word-related data to rank or score each word and/or word-pair. In some examples, a top words function is performed to generate the word-pair score for each word-pair, such as, but not limited to, the top words function 450 shown in FIG. 4 below.

The selected word-pair 124, in some examples, is output to a user via a user interface device associated with a user device 126. The user device 126 represent any device executing computer-executable instructions. The user device 126 can be implemented as a mobile computing device, such as, but not limited to, a wearable computing device, a mobile telephone, laptop, tablet, computing pad, netbook, gaming device, and/or any other portable device. The user device 126 includes at least one processor and a memory. The user device 126 can also include a user interface component for displaying or otherwise presenting the selected word-pairs to one or more users.

In this manner, the ITBS model provides a novel explainability method for interpreting text-based item recommendations. Explainability refers to the ability of the model to identify word-pairs used to interpret model predictions and/or explain recommendations made by the recommendation model.

The ITBS model 120, in some examples, produces interpretable explanations for the similarity of two textual paragraphs. The ITBS model 120 interprets text-based similarity inferred by state-of-the-art language models, such as, but not limited to, the recommendation model 102. The ITBS model utilizes internal information from the underlying recommendation model 102 to interpret model predictions, such as, but not limited to, the recommended items generated by the recommendation model 102.

In other examples, the ITBS model is a BERT model providing BERT interpretations (BTI), a novel technique for interpreting unlabeled paragraph similarities inferred by a pretrained BERT model. BTI can interpret the similarity between paragraph-pairs by detecting and matching important words that dictate the essence of each paragraph. Aspects of the disclosure demonstrate the ability of BTI to interpret the similarity between paragraphs in unlabeled settings. BTI enables explaining unlabeled paragraph similarities inferred by a pre-trained BERT model.

Figure 2:
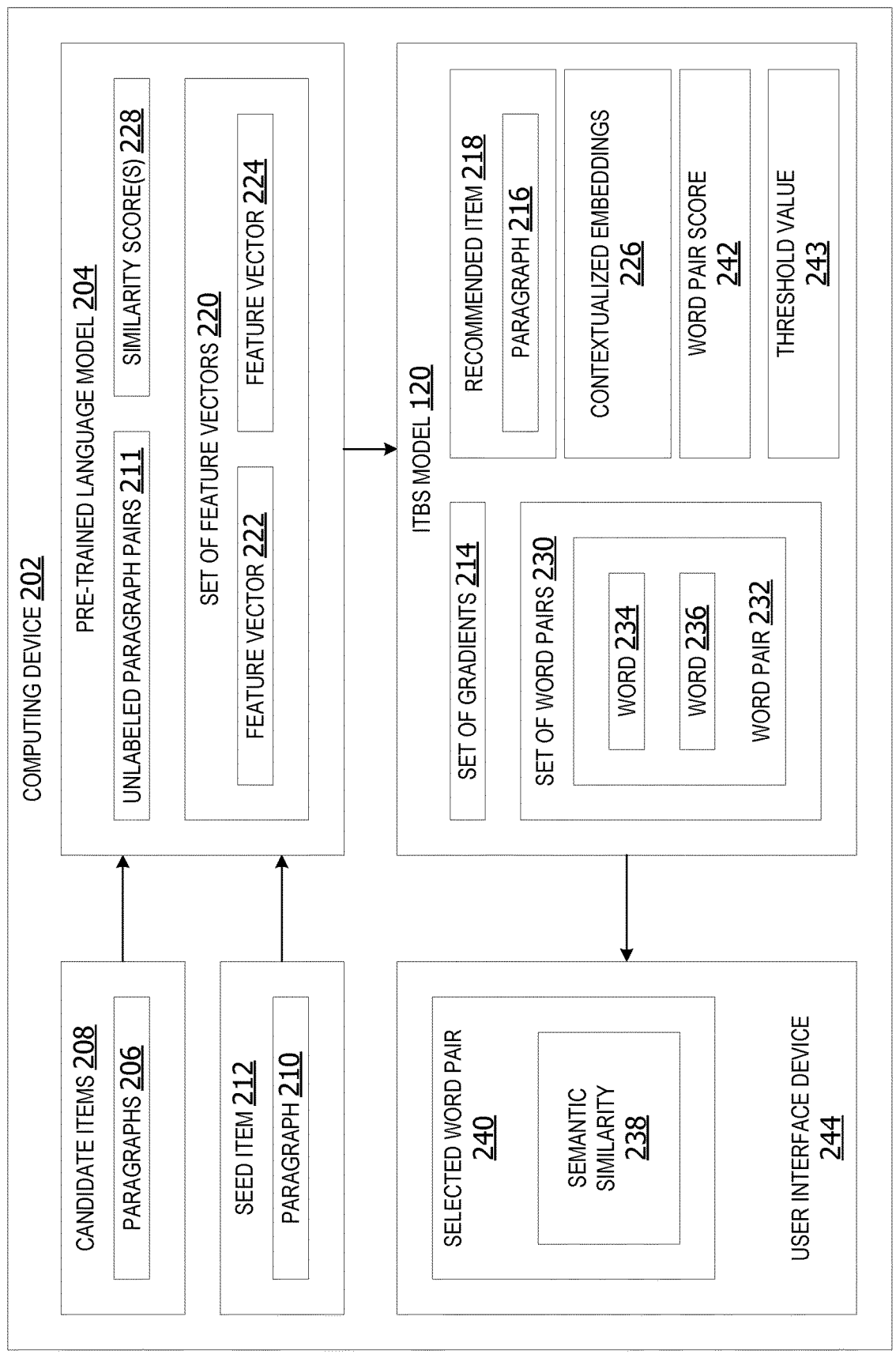
FIG. 2 is an exemplary block diagram illustrating a computing device using an ITBS model to interpret recommendations generated by a pre-trained language model.

FIG. 2 is an exemplary block diagram illustrating a computing device 202 using an ITBS model 120 to interpret recommendations generated by a pre-trained language model 204. In the example of FIG. 2, the computing device 202 represents any device executing computer-executable instructions (e.g., as application programs, operating system functionality, or both) to implement the operations and functionality associated with the computing device 202. The computing device 202 in some examples includes a mobile computing device or any other portable device. A mobile computing device includes, for example but without limitation, a mobile telephone, laptop, tablet, computing pad, netbook, gaming device, and/or portable media player. The computing device 202 can also include less-portable devices such as servers, desktop personal computers, kiosks, or tabletop devices. Additionally, the computing device 202 can represent a group of processing units or other computing devices. In some examples, the computing device 202 has at least one processor and a memory. The computing device 202 in other examples includes a user interface component, such as, but not limited to, the user interface device 244.

The pre-trained language model 204 is a machine learning language model for generating recommendations, such as, but not limited to, the recommendation model 102 in FIG. 1. The pretrained language model 204 analyzes text-based paragraphs 206 describing candidate items 208 associated with a given domain and a text-based paragraph 210 describing a seed item 212.

In some examples, the ITBS model 120 is a model for interpreting similarities between unlabeled paragraph pairs 211 inferred by the pre-trained language model 204. The ITBS model 120 calculates a set of gradients 214 representing the first text-based paragraph 210 describing a seed item 212 and a second text-based paragraph 216 describing a recommended item 218 predicted to be similar to the seed item by the pre-trained language model 204.

The set of gradients 214, in some examples, is calculated with respect to a cosine similarity function applied on a set of feature vectors 220. A feature vector is a mathematical representation output for every description. A feature vector for an item description can be used to compute similarities between items. The vector is a line of numbers. Feature vectors representing two different items can be used to calculate the cosine or angle between two vectors and that corresponds to the degree of similarity between the items.

The set of feature vectors 220 includes a feature vector 222 representing the seed item paragraph 210 and a second feature vector 224 representing the recommended item paragraph 216. The ITBS model 120 generates contextualized embeddings 226 based on the set of gradients 214 and a similarity score 228. The similarity score 228 measures an affinity between the seed item descriptive paragraph 210 and the recommended item descriptive paragraph 216.

In other examples, the ITBS model 120 identifies a set of word-pairs 230 based on the contextualized embeddings 226. The set of word-pairs 230 includes at least one word-pair 232. A word-pair 232 includes a word 234 or part of a word selected from the seed item paragraph 210 matched to a second word 236 or portion of a word selected from the recommended item paragraph 216. The first word 234 and the second word 236 have a similar semantic meaning. In other words, the matched words have semantic similarity 238.

In still other examples, the ITBS model 120 selects a word-pair 240 from the set of word-pairs 230 based on a word-pair score 242. The word-pair score 242 indicates a degree of influence exerted by the word-pair on selection of the recommended item from a plurality of candidate items.

In some examples, the ITBS model 120 selects the word-pair from the set of word-pairs 230 having the highest score. In other examples, the ITBS model 120 selects one or more word-pairs from the set of word-pairs 230 having a word-pair score that exceeds a threshold value 243.

The user interface device 244, in some non-limiting examples, outputs the selected word-pairs and/or word-pair scores to the user. The word-pairs may be output separately from the paragraphs or output with the paragraphs from which the words in the word-pairs were extracted. In such cases, the selected words in the selected word-pairs are highlighted, underlined, bolded, marked or otherwise set-off from the other words in the paragraph(s).

In other examples, the selected word-pairs and/or word-pair scores are transmitted to a remote computing device for presentation to a user, such as, but not limited to, the user device 136 in FIG. 1. In such cases, the word-pairs and scores are sent to the remote computing device via a network. The network can be implemented by one or more physical network components, such as, but without limitation, routers, switches, network interface cards (NICs), and other network devices. The network may be any type of network for enabling communications with remote computing devices, such as, but not limited to, a local area network (LAN), a subnet, a wide area network (WAN), a wireless (Wi-Fi) network, or any other type of network. In this example, the network is a WAN, such as the Internet. However, in other examples, the network can be a local or private LAN.

Figure 3:
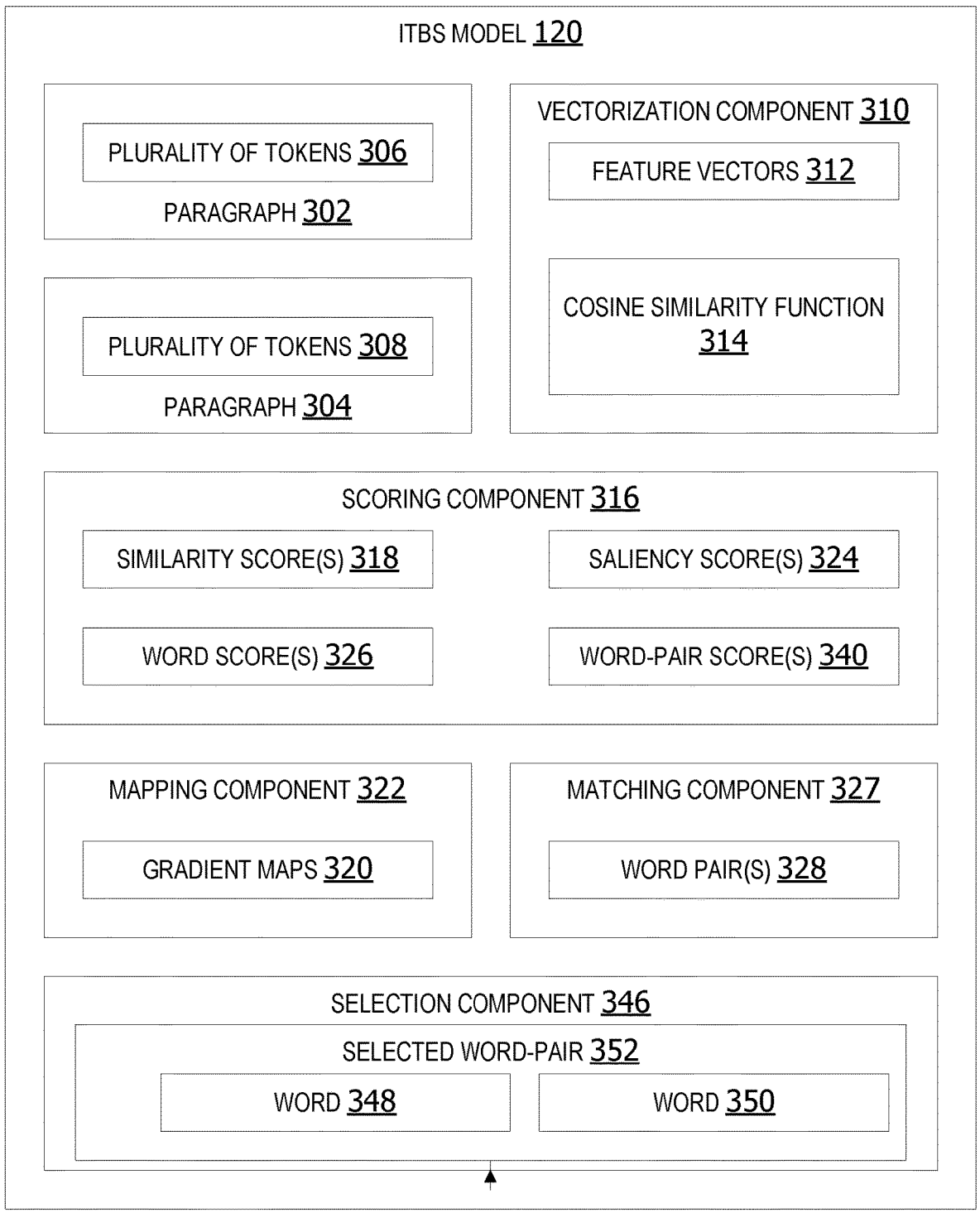
FIG. 3 is an exemplary block diagram illustrating an ITBS model for interpreting text-based similarity predictions.

FIG. 3 is an exemplary block diagram illustrating an ITBS model 120 for interpreting text-based similarity predictions. In some examples, two paragraphs are propagated through a pre-trained (BERT) model in order to form contextual paragraph representations. The first paragraph is a paragraph 302 describing a seed item. The second paragraph is a paragraph 304 describing a recommended item. Each paragraph is tokenized within the ITBS model 120. A plurality of tokens 306 represents paragraph 302. The paragraph 304 is tokenized into a plurality of tokens 308.

A vectorization component 310 calculates the feature vectors 312 representing each paragraph and the partial derivations of the input embeddings with respect to the cosine between the two feature vectors. Each time, one feature vector is calculated in advance and used as a constant, and the second feature vector is generated by propagating the paragraph 302 and/or the paragraph 304 through the model to derive gradients on its intermediate representations.

A scoring component 316 generates one or more similarity score(s) 318, such as the cosine similarity, which is used to measure the affinity between the paragraphs. The cosine similarity may be generated using a cosine similarity function 314. Gradient maps 320 for the embeddings of the first paragraph 302 are calculated with respect to the similarity of the first paragraph 302 to the second paragraph 304. The gradient maps 320, in some examples, are generated by a mapping component 322. The gradient maps 320 are scaled by a multiplication with the corresponding activation maps and summed across the feature dimensions to produce one or more saliency score(s) 324 for every token in the first paragraph. Tokens represent words or portions of words. The saliency score for a token in the plurality of tokens may be referred to as a token-saliency score. The token saliency score(s) 324 for the plurality of tokens 306 are then aggregated to words, yielding word-scores 326.

In some examples, ITBS model 120 performs the same procedure, with the first paragraph 302 and second paragraphs 304 reversed. This yields word-scores for the second paragraph, calculated with respect to the similarity with the first paragraph. A matching component 327 matches words from both paragraphs, based on a similarity score obtained by their latent representations, and scores each pair of words by the word-scores 326 associated with each element and the similarity score 318 of the pair.

The matching component 327, in this example, is an algorithm for generating word-pair(s) 328 based on the word score(s) 326. A word-pair is a pair of words, including a word 348 from the first paragraph 302 and a matching word 350 from the second paragraph 304. A matching word is a word having the same or similar semantic meaning. A word-pair score in the one or more word-pair score(s) 340 is a score indicating a degree of similarity between the words in the word-pair. A first word-pair with a higher word-pair score than a second word-pair indicates the two words in the first word-pair are more similar in semantic meaning and relevance to the prediction than the words in the second word-pair. The most important word-pairs are then detected and retrieved as explanations. In some non-limiting examples, a selection component 346 selects the one or more word-pairs. The selected word-pair 352 is used for interpreting the recommendation(s) generated by the recommendation model based on the word-pair scores. The selection component is a software component implementing one or more algorithms for selecting word-pairs for use in interpreting predictions generated by a recommendation model.

Figure 4:
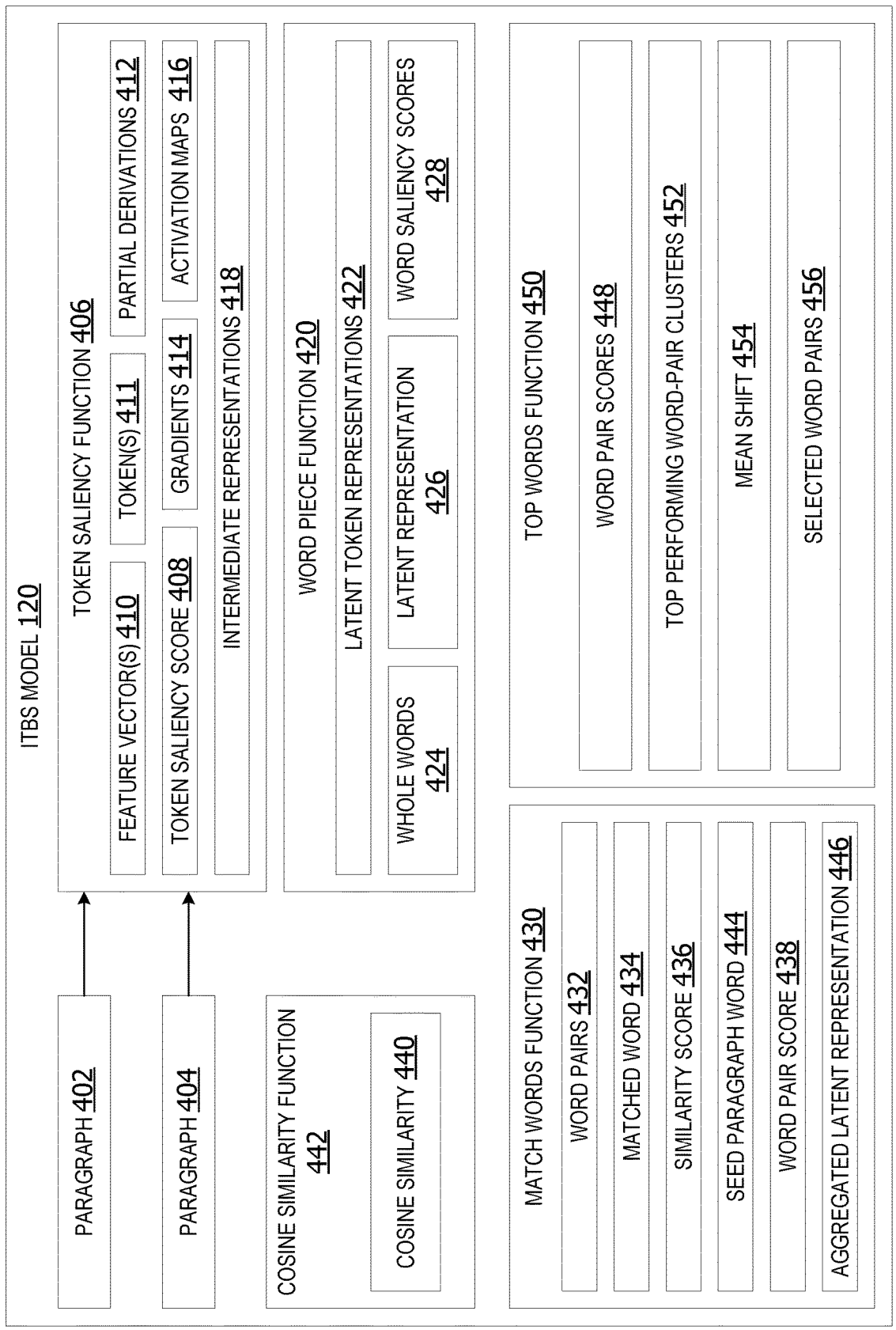
FIG. 4 is an exemplary block diagram illustrating an ITBS model identifying word-pairs in text-based descriptions of items to explain pre-trained language model predictions.

FIG. 4 is an exemplary block diagram illustrating an ITBS model 120 identifying word-pairs in text-based descriptions of items to explain pre-trained language model predictions. In some examples, the paragraph 402 describing the seed item and the paragraph 404 describing the recommended item are propagated separately through the backbone language (BERT) model. By propagating each paragraph through BERT, the model produces a sequence of latent tokens. Each element in the sequence is associated with its matched element in the input. A feature vector can be computed for each paragraph by average pooling of the latent tokens.

In other examples, all tokens are first embedded by three learned functions: token (T), position (O), and segment embeddings (G), denoted by T, O, and G, respectively. The token embedding transforms tokens' unique values into intermediate vectors. The position embedding encodes the token positions to the same space. The segment embedding is used to associate each token with one out of two sentences (since in the original BERT training, the model is fed by sentence-pairs).

Each paragraph, in still other examples, is fed as a separate sequence into the ITBS model 120. The ITBS algorithm builds upon the T and O embeddings. Specifically, given the paragraphs, BTI first calculates saliency maps, for each paragraph, by utilizing the activation map values of T and O, along with their gradients calculated with respect to a cosine score between the feature vectors of both paragraphs.

In this non-limiting example, the ITBS model 120 invokes a token saliency function 406 to infer a token-saliency score 408 for each of the one or more token(s) 411 in the given paragraph-pair. The token saliency is first applied to paragraph 402 and paragraph 404 ($P_1, P_2$). The roles of paragraph 402 and paragraph 404 are reversed. Since both sides are analog, the token saliency function 406 is described by its first application.

For a given paragraph pair (p_1,p_2), the function propagates each paragraph through BERT, calculates the feature vectors 410 for each paragraph and the partial derivations 412 of the input embeddings with respect to the cosine between the two feature vectors. Each time, one feature vector is calculated in advance and used as a constant, and the second is generated by propagating the paragraph through the model to derive gradients on its intermediate representations 418.

The system calculates the gradient(s) 414 with respect to the cosine function in a way that enforces gradients 414 that maximize the cosine similarity between both paragraphs. The gradients 414 are multiplied by activation maps 416 of the same embeddings. The motivation behind multiplication is as follows: the system expects important tokens to have embedding values and gradients that agree in their sign—namely both gradients for the seed item paragraph and the gradient for the recommended item paragraph are positive or both gradients for both paragraphs are negative. For example, embeddings and gradients with higher absolute values are more significant than those with values near zero.

The inverse word piece function 420 is applied by the ITBS model 120 in other examples. This function receives the tokens 411, the latent token representations 422, and the token-saliency scores 408 of a given paragraph. The word piece function 420 aggregates all arguments to word-level representation, retrieving whole words 424 (rebuilt from tokens), latent representation(s) 426 for each word, and words-saliency scores 428. The second and third aggregations employ predefined functions on the latent tokens and token-saliency scores associated with the same word, respectively. The result word-level representation is then retrieved as an output.

In some examples, the latent representation 426 of a word is defined by the mean representation of its tokens, and the importance of a given word is matched to the maximal importance of its tokens. For example, assuming a given paragraph comprising the word "playing", for which the BERT tokenizer decomposes the word to the tokens "play" representing the root word and the token "ing" associated with the suffix. Assuming the token saliency function 406 assigns the tokens with the token-saliency scores 0.1 and 0.8, respectively. Then, the importance of the word "playing" would be associated with a score of 0.8.

By calling a match words function 430, the ITBS model identifies word-pairs 432 from both paragraphs that share the most similar semantics. Specifically, for each seed paragraph word 444 from the seed paragraph 402, the function retrieves a matched word 434 from the recommended item paragraph 404 that maximizes the similarity score 436 between the aggregated latent representation 426 of the words. The similarity score is maximized by selecting a word to match with a seed item word that has the highest similarity score with the seed item word.

The match words function 430, in other examples, calculates a word-pair score 438 for each word-pair. The word-pair score 438 represent the accumulated importance of the word-pair and defined as the multiplication of the word-scores of both words in the word-pair along with the cosine similarity 440 between the latent representation of the words. The cosine similarity 440 may be generated by a function, such as the cosine similarity function 442.

The ITBS model 120 optionally calls a top words function 450, which retrieves a sub-sequence of the most important word-pairs by clustering the word-pairs scores 448 and identifying the top-performing word-pair clusters 452. For retrieving the most important word-pairs, a mean shift 454 algorithm is run on the set of word-pairs scores 448, to obtain the modes of the underlying distribution. The mean shift 454 is a clustering algorithm that reveals the number of clusters in a given data and retrieves the corresponding centroid for each detected cluster. In this example, the mean shift function is applied to the one-dimensional (1D) data of all word-pair scores and identifies the subsets of the most important pairs, as the cluster associated with the top-k centroids. In ITBS, top-k is a predefined hyperparameter. The detected most important word-pairs are retrieved as a sequence to form selected word-pairs 456, which can be then visualized to interpret the similarity between the given two paragraphs.

Figure 5:
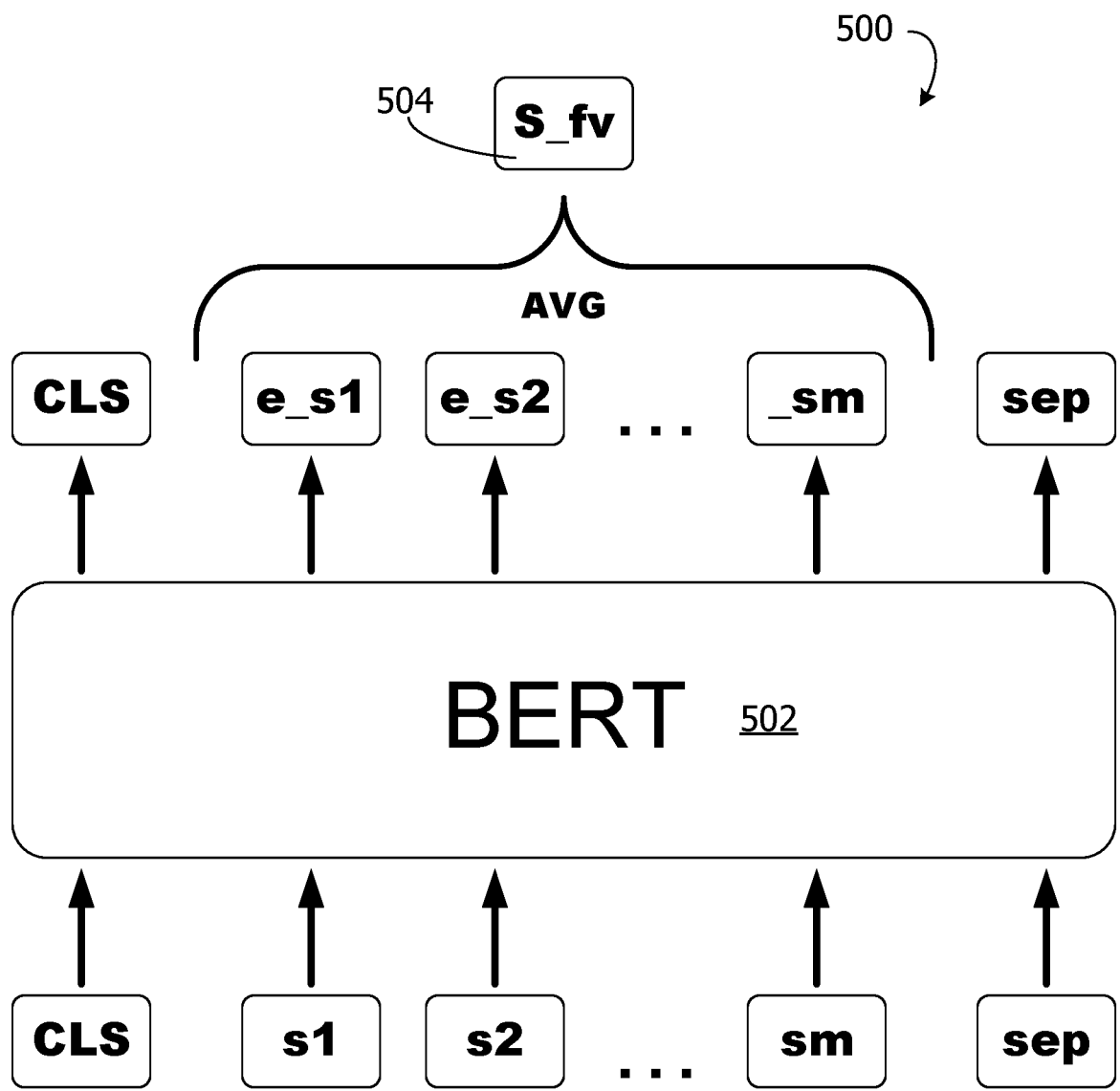
FIG. 5 is an exemplary block diagram illustrating a bidirectional encoder representations from transformers (BERT) model.

FIG. 5 is an exemplary block diagram 500 illustrating a bidirectional encoder representations from transformers (BERT) model 502. Text-based paragraphs are tokenized, such that, the paragraph or sentences in the paragraph are broken into words and tokens representing each word. The token "$S_1$" to "$S_m$" are tokens representing words of a sentence where the sentence includes an "m" number of different words. The "$S_1$" token represents the first word in the sentence. The classification (CLS) token represents the beginning of the first sentence and the separator (SEP) token represents the end of the first sentence in the pair. The CLS token is a dummy token or vector input into the language model to indicate the beginning of a sentence.

The sequence of tokens representing the sentence are fed into the BERT model. The BERT model performs a series of mathematical operations or functions on different words from the input. The output of the BERT model has the same structure as the input, but each token or word is within latency space. Each token represents a word or part of a word. The system can generate a vector representation 504 that represents semantics of the words in the paragraph or sentence by taking the words or tokens of the sentence and averaging them This results in the feature vector 504 used to score similarity between two different bodies of text.

In some examples, the ITBS model predicts similarity between two items in a common domain or catalog of items. The score indicates a level of similarity between the items. The system explains the similarity decision/score and computes a gradient indicating the degree of influence of any of the words in the input decision that impacted the final decision output recommendation.

The ITBS model, in other examples, includes BTI functions and its applications for explainable text similarity in self-supervised pre-trained language models. In the example shown in FIG. 5, the system is built upon BERT, however, BTI can be applied with other recent transformer-based language models.

In an example, the vocabulary of words in a given language be represented as follows:

$$V=\{ti\}_{i=1}^V$$

where "S" is the set of all possible sentences induced by "V" and "P" is the set of all possible paragraphs generated by "S". BERT can be defined as the following function:

$$B: P \to R^{N \times h},$$

where "h" is the hidden layer size, and "N" is equal to a maximal sequence length of 512 tokens supported by the model. In inference, BERT receives a paragraph $p \in P$ and decomposes it into a sequence of $$q \in N \text{ tokens } (P^j)_{j=1}^q$$

by utilizing the word piece function. The sequence is wrapped and padded to "N" elements, by adding the special CLS, SEP and PAD tokens. This token sequence can be written as:

$$I^P := (CLS, (P^j)_{j=1}^q, SEP, \ldots, PAD).$$

In BERT, all tokens are embedded by three learned functions: token, position, and segment embeddings, denoted by T, O, and G, respectively. The token embedding transforms tokens unique values into intermediate vectors.

$$T(I^P) \in R^{N \times h}$$

The position embedding encodes the token positions to the same space, where:

$$O((j)_{j=1}^N) \in R^{N \times h}$$

The segment embedding is used to associate each token with one out of two sentences $$G(\{0,1\}N) \in R^{N \times h},$$

because in the original BERT training, the model is fed by sentence-pairs.

In other examples, BERT receives a single paragraph as input at a time, rather than receiving input as paragraph-pairs sequences. In many cases, paragraph similarity labels do not exist, therefore, fine-tuning the language model to the task of paragraph-pairs similarity may not be possible with paragraph-pairs sequences. This entails the use of a pre-trained language model, that is commonly trained by sentence-pairs or chunks of continuous text and does not specialize in nonconsecutive paragraph-pairs. Therefore, inferencing with nonconsecutive paragraph-pairs may introduce instabilities, due to the discrepancy between both phases. The technical limitation of maximal sequence length in BERT architecture may be problematic with regard to inputting two paragraphs as a unified sequence because these pairs may exceed the limit of 512 tokens.

In other examples, by propagating a paragraph "p" through BERT, the model produces a sequence as follows:

$$B(p) \in R^{N \times h}$$

of latent tokens. Each element in B(p) is associated with its matched element in $I^P$.

A feature vector can be computed for each paragraph by average pooling of the output tokens as follows:

$$F_p := \frac{1}{9}\sum_{i=2}^{q+1} B(p)i,$$

omitting the latent elements associated with the CLS, SEP and PAD input tokens. The similarity between paragraph-pairs can be interpreted by marking important words, from each element, that both forming a meaningful match and dictating the semantics of each paragraph. Hence, given two paragraphs denoted by $P_1 \in P$ and $P_2 \in P$, we build BTI to identify important word-pairs with similar semantics:

$$M:=\{(xi,yi)\}_i^e=1,$$

where $$xi \in P_1 \text{ and } y_i \in P_2,$$

for all i, and e is the number of pairs detected by BTI. Since each paragraph is fed as a separate sequence, the BTI method builds upon the T and O embeddings.

Specifically, given the paragraphs $P_1$ and $P_2$, BTI first calculates saliency maps, for each paragraph, by utilizing the activation map values:

$$E(I^{P1}) \in R^{q1 \times h}$$

and and $E((I^{P2}) \in R^{q1 \times h}$ where $$E(I^P):=T(I^P)+O((i)i^N=1$$

along with the gradients calculated on the same activations with respect to a cosine score between the feature vectors of both paragraphs. The term "$q_1$" and "$q_2$" denote the number of tokens in the word piece decomposition of "$P_1$" and "$P_2$", respectively.

Figure 6:
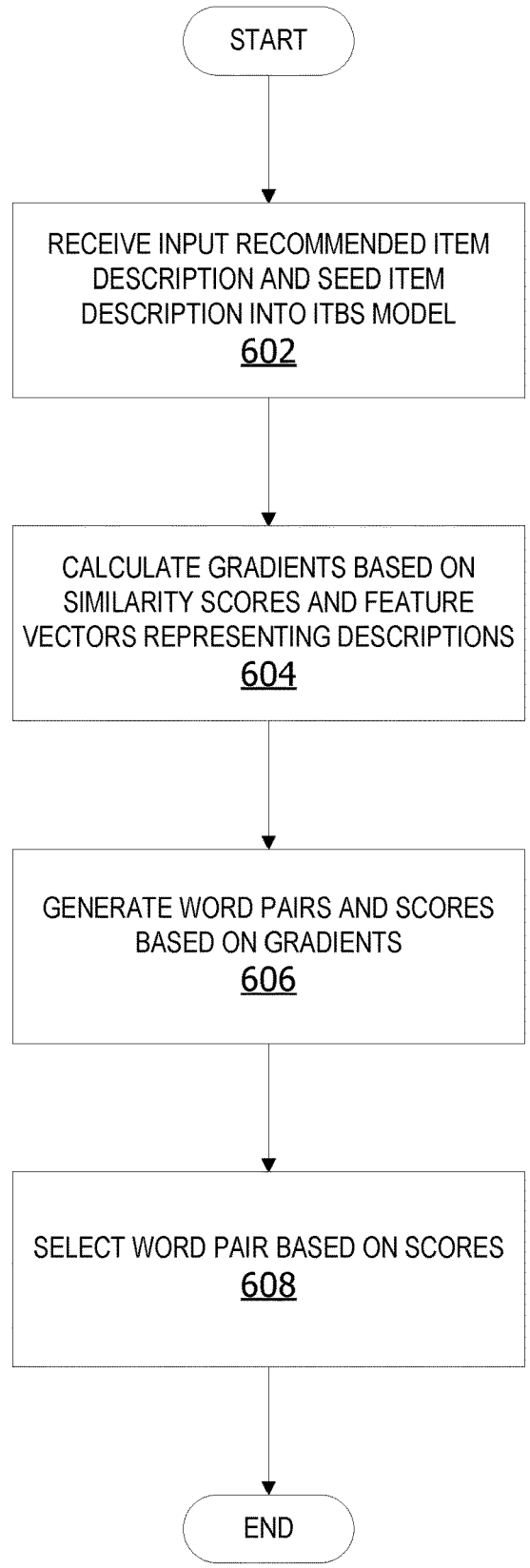
FIG. 6 is an exemplary flow chart illustrating operation of the computing device to interpret text-based similarity predictions.

FIG. 6 is an exemplary flow chart illustrating operation of the computing device to interpret text-based similarity predictions. The process shown in FIG. 6 is performed by a ITBS model, executing on a computing device, such as the user device 136 in FIG. 1, the computing device 202 in FIG. 2, and/or the computing device 1400 of FIG. 14.

The process begins by receiving input recommended item descriptions and a seed item description into the ITBS model at 602. The ITBS model is a model for interpreting language model recommendations, such as, but not limited to, the ITBS model 120 in FIG. 1, FIG. 2, FIG. 3, and FIG. 4, as well as the BERT model 502 in FIG. 5. The ITBS model calculates gradients based on similarity scores and feature vectors representing item descriptions at 604. The ITBS model generates word-pairs and word-pair scores based on the gradients at 606. At least one word-pair is selected based on the word-pair scores at 608. The process terminates thereafter.

While the operations illustrated in FIG. 6 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 6.

Figure 7:
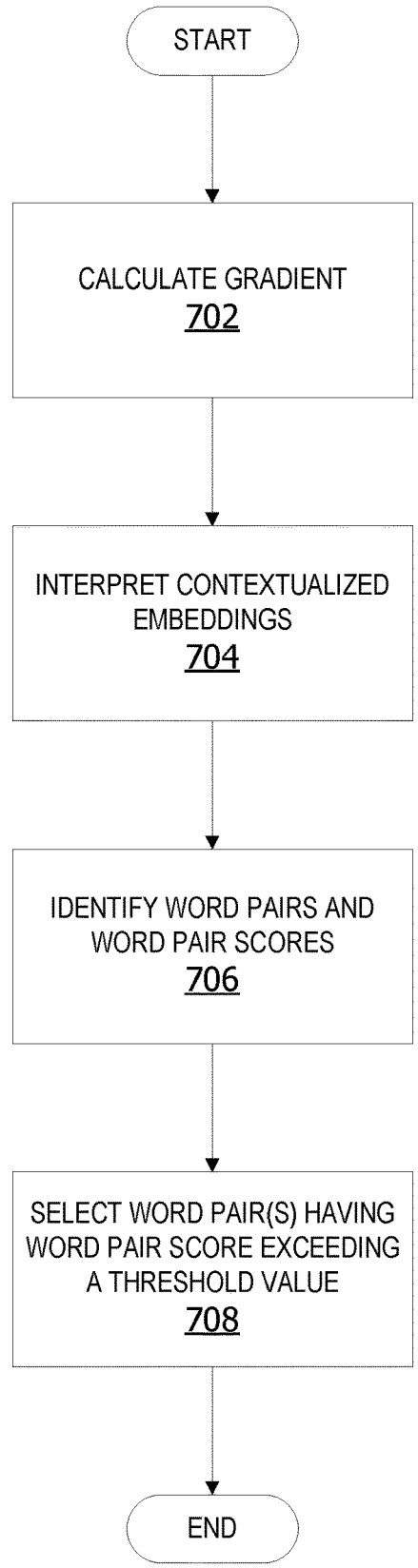
FIG. 7 is an exemplary flow chart illustrating operation of the computing device to identify a word-pair based on word-pair scores.

FIG. 7 is an exemplary flow chart illustrating operation of the computing device to identify a word-pair based on word-pair scores. The process shown in FIG. 7 is performed by a ITBS model, executing on a computing device, such as the user device 136 in FIG. 1, the computing device 202 in FIG. 2, and/or the computing device 1400 of FIG. 14.

The process begins by calculating gradients associated with a text-based paragraph describing a seed item and a text-based paragraph describing a recommended item at 702. The ITBS model interprets contextualized embeddings at 704. The ITBS model identifies word-pairs and word-pair scores at 706. The ITBS model selects one or more word-pair(s) having a word-pair score exceeding a threshold value at 708. The process terminates thereafter.

While the operations illustrated in FIG. 7 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 7.

Figure 8:
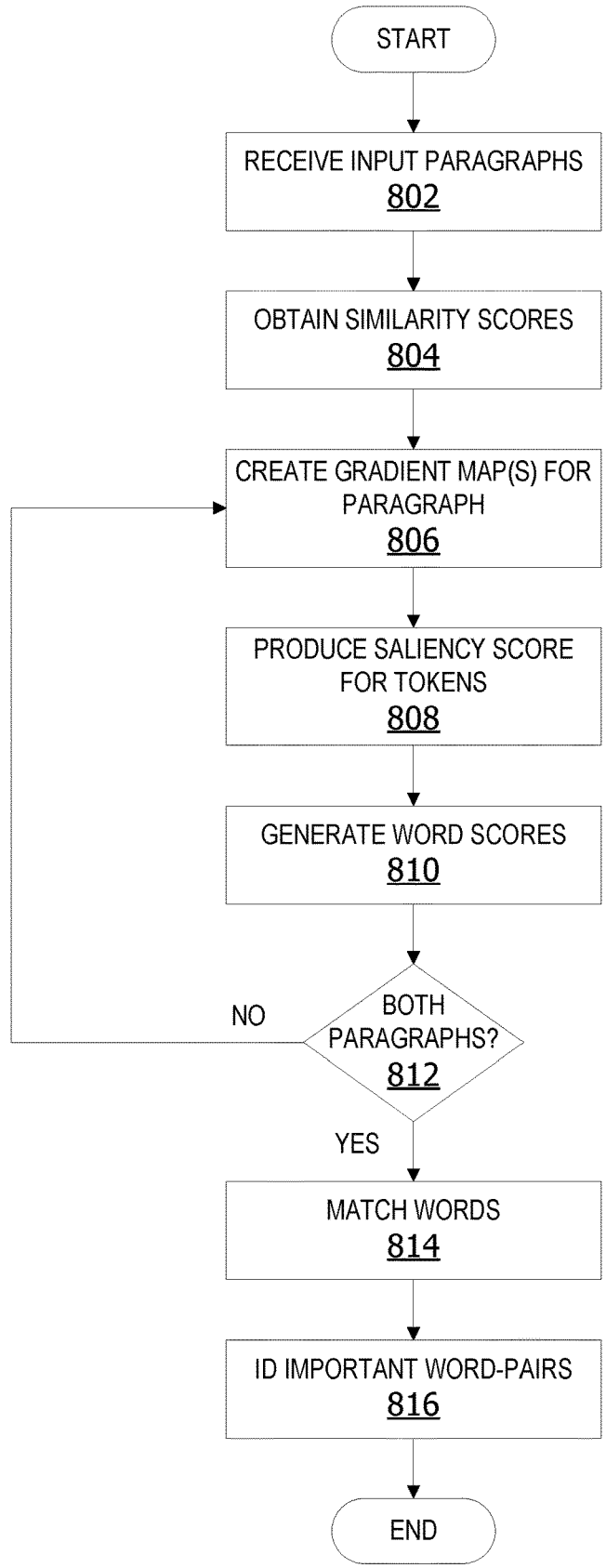
FIG. 8 is an exemplary flow chart illustrating operation of the computing device to select word-pairs from text-based descriptions of items.

FIG. 8 is an exemplary flow chart illustrating operation of the computing device to select word-pairs from text-based descriptions of items. The process shown in FIG. 8 is performed by a ITBS model, executing on a computing device, such as the user device 136 in FIG. 1, the computing device 202 in FIG. 2, and/or the computing device 1400 of FIG. 14.

The process begins by receiving input paragraphs at 802. In this example, two paragraphs are propagated through a pre-trained ITBS (BERT) model in order to form contextual paragraph representations. The two paragraphs include the seed item paragraph and the recommended item paragraph. A similarity score is obtained at 804. In some examples, the similarity score is obtained from the recommendation model. In other examples, the ITBS model generates the similarity score. The similarity score is used to measure the affinity between the two paragraphs.

The ITBS model creates one or more gradient maps for the embeddings of the first paragraph. The gradient map(s) are calculated with respect to the similarity of the seed item paragraph to the recommended item paragraph. These gradient maps are scaled by a multiplication with the corresponding activation maps and summed across the feature dimensions to produce a saliency score for every token in the seed item paragraph at 808. The token saliency scores are then aggregated to words to generate word-scores at 810.

A determination is made whether this procedure has been performed with regard to both paragraphs at 812. If no, the ITBS model returns to operation 806 and performs the same procedure described in operations 806 through 812, with the first paragraph and second paragraphs reversed. This yields word-scores for the second paragraph, calculated with respect to the similarity with the first one. The algorithm matches words from both paragraphs, based on a similarity score obtained by their latent representations, and scores each pair of words by the word-scores associated with each element and the similarity score of the pair at 814. The most important word-pairs are then detected and retrieved as explanations at 816.

While the operations illustrated in FIG. 8 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 8.

FIG. 9 is an exemplary diagram illustrating an algorithm for interpreting text-based similarity in pre-trained language model recommendations. In this example, a cold textual catalog includes an "N" number of candidate items. Each item is associated with a paragraph description. A text-based recommendation model "X" utilizes a backbone language model "L". The text-based recommendation model is a model such as, but not limited to, the recommendation model 102 in FIG. 1 and/or the pre-trained language model 204 in FIG. 2. In this non-limiting example, the language model "L" is implemented as a BERT model.

A seed item "s" and a recommended item "r" are obtained by the recommendation model "X". The seed item "s" and the recommended item "r" are associated with the paragraph descriptions "$P_1$" and "$P_2$", respectively. The similarity between the paragraphs "$P_1$" and "$P_2$" are interpreted by marking important words, from each element, that both forming a meaningful match and dictating the semantics of each paragraph.

In some examples, ITBS invokes the token saliency (TokenSaliency) function to infer a token-saliency score for each token in the given paragraph-pair. In lines 1-2, BTI invokes the token saliency function to infer a token-saliency score for each token in the given paragraph-pair. The token saliency function is first applied to ($P_1$, $P_2$).

In line 2, the roles of $P_1$ and $P_2$ are reversed. Since both sides are analog, the token saliency is described by its first application. For a given paragraph pair (p_1,p_2), the function propagates each paragraph through BERT, calculates the feature vectors ($F_{P_1}$ and $F_{P_2}$) for each paragraph and the partial derivations:

$$g(P_1, P_2) \in R^{N \times q^2}$$

of the input embeddings $E(I^{P_2})$ with respect to the cosine between the two feature vectors.

The first feature vector is used as a constant, the second is generated by propagating $P_2$ through the model to derive gradients on its intermediate representations. Formally:

$$g(P_1, P_2) := -\frac{\partial C(F_{P_1}, F_{P_2})}{\partial E(P_2)},$$

where "C" is a similarity function. The ITBS model utilizes the cosine similarity function. By calculating the negation of the gradients, the numerator enforces gradient derivations that maximize the cosine similarity between both paragraphs. The gradients are then multiplied by the activation maps of the same embeddings:

$$s = NRM\left[\sum_{k=1}^{h} P_1(E(P_2) i \circ g_i)k\right]_{i=1}^{q^2}$$

where the symbol "φ" is the ReLU activation function, the symbol "∘" represents the Hadamard product, and NRM is the min-max normalization, which transforms the data to the range [0,1]. Important tokens are expected to have embedded values and gradients that agree in their sign, namely both positive or both negative. This indicates that the gradient emphasize the embeddings rather than decrease their value. Additionally, embeddings and gradients with higher absolute values are more significant than those with values near zero.

In line 3-4, BTI applies the word piece (WordPiece) function. This function receives the tokens, the latent token representations, and the token saliency scores of a given paragraph. The function then aggregates all arguments to word-level representation, retrieving whole words (rebuilt from tokens), latent representation for each word, and word-saliency scores. The second and third aggregations employ predefined functions φ and ψ on the latent tokens and token saliency scores associated with the same word, respectively. The result word-level representation is then retrieved as an output. The terms "$w_1$" and "$w_2$" denote the words sequences produced by aggregating the tokens of $P_1$ and $P_2$, respectively. The terms $$"\hat{w}^1"$$

and $$"\hat{w}^2"$$

denote the aggregated latent word-level representation of $P_1$ and $P_2$, respectively. Analogously, the word-saliency scores are denoted by "$w_s^1$" and "$w_s^2$". In this example, the symbols "φ" and "ψ" are defined as the mean and maximum functions. This entails that the latent representation of a word would be defined by the mean representation of its tokens, and the importance of a given word would be matched to the maximal importance of its tokens.

In lines 5-6, the match words (MatchWords) function identifies word-pairs from both paragraphs that share the most similar semantics. Specifically, for each word represented by:

$$w_i^1, w_i^1 \in w^1,$$

the function retrieves a matched word represented by:

$$w_j^2 \in w_2,$$

that maximizes the similarity score between the aggregated latent representation of the words $$w_i^2 * := \underset{w_j^2 \in w_2}{\operatorname{argmax}} C\left(\hat{w}_i^1, \hat{w}_j^2\right), \text{ where}$$

$$w_i^1 \in w^1 \text{ and } w_i^2 \in w^2,$$

are the means of the latent tokens associated with the words "$w_i^1$" and "$w_j^2$", respectively. In addition to conducting matches between word-pairs, the match words function calculates a word-pair score for each pair. The word-pair score represent the accumulated importance of the pair and defined as the multiplication of the word-scores of both words along with the cosine similarity between the latent representation of the words. Formally, the word-pair score of the pair ($w_i^1$, $w_j^2$) can be written as:

$$U(w_i^1, w_j^2) := c^{ij} \cdot s_i^1 \cdot s_j^2$$

where "$c^{ij}$" is the cosine similarity between the latent representation of "$w_i^1$, $w_j^2$", and "$s_i^1$, $s_j^2$" are the saliency scores of the words "$w_i^1$" and "$w_j^2$", respectively.

In line 7, the ITBS model calls the top words (TopWords) function, which retrieves a sub-sequence of the most important word-pairs by clustering the word-pairs scores and identifying the top-performing clusters. For retrieving the most important word-pairs, a mean shift (MeanShift) algorithm is run on the set of word-pairs scores, to obtain the modes of the underlying distribution. The mean shift is a clustering algorithm that reveals the number of clusters in a given data and retrieves the corresponding centroid for each detected cluster. In this example, the mean shift is applied to the 1D data of all as follows:

$$U(w_i^1, w_j^2)'$$

and identifies the subsets of the most important pairs, as the cluster associated with the top_k centroids. In BTI, top_k is a predefined hyperparameter. The detected most important word-pairs are retrieved as a sequence, which can be then visualized to interpret the similarity between the given two paragraphs.

In an example scenario, the ITBS model has the ability to explain the similarity between item descriptions, taken from a fashion dataset. The system is employed to interpret the similarity between each seed and candidate items taken from a fashion dataset. The fashion dataset in this non-limiting example, includes approximately one thousand (~1000) items. Each item contains textual descriptions in the form of a single paragraph. ITBS is employed on the descriptions of both items. The BERT model is fine-tuned by applying ten additional epochs on a corpus obtained by the collection of item descriptions. Since item similarity labels do not exist, the BERT model is fine-tuned by utilizing the BERT pre-training paradigm. The continuation of the pre-training phase allows the BERT model to specialize in the given dataset at hand to improve performance over a variety of language tasks.

The BERT model infers item-to-item similarities by propagating all item descriptions from the catalog through the specialized BERT model. For each item, the system extracts a feature vector. Then, given a seed item s, the model calculates the cosine similarity between the feature vector of the seed item "Fs" and the feature vectors of all the other items in the dataset/catalog. The candidate item that maximizes the cosine similarity is retrieved as the most similar item.

FIG. 10 is an exemplary table 1000 illustrating results for explaining text-based item similarities in a fashion data set. The table 1000 in this non-limiting example presents BTI results for explaining text-based item similarities in a fashion dataset. Each sample comprises two paragraphs: (1) the seed item description (top left), and (2) the description of the most similar item with respect to the seed (bottom left). The words retrieved by BTI are associated with saliency scores (shown next to each word). The "matched-words" column depicts the word-pairs chosen by BTI. The "word similarity" column presents the cosine score between the word-pairs. The "word-pair score" column exhibits the score.

To interpret the similarity between each seed and candidate items, the ITBS model employs BTI on the descriptions of both the seed item and the candidate item. The table 1000 presents the interpretations of BTI for four representative seed-candidate items from the fashion dataset. The first sample comprises seed and candidate items that are both Cardigans. For this sample, BTI interprets the similarity between the description of both items by highlighting the words "cardigan" and "sweatshirt" that appear on both items, indicating the type of the items, as well as the words "seams" in both items and the "asymmetric" in the seed item that is matched with the word "diagonal" in the candidate item, indicating the style properties of both items.

In the second sample, comprising two paragraphs of two glove items, BTI highlights the words "gloves" in both items, which indicates the type of the item, as well as the phrases "touchscreen-compatible" and "smartphone-friendly", that strongly explain the similarity between the items.

For the third sample, BTI highlights the category of both items ("shirt"), and other key characteristics including "running" and "sports", as well as "ventilating" and "breathable", that strongly correlate to each other. By obtaining an accurate interpretation for the similarity between paragraphs, relying on BERT intermediate representations, BTI reveals the reasoning process behind the embedding mechanism of BERT. Other techniques for interpreting paragraphs similarities, that do not utilize the intermediate representations of BERT, would be independent of the model weights and therefore would not be able to assess the reliability of the model. However, since BTI solely relies on BERT intermediate representations, it can be used to assess the validity of the underlying language model. In other words, BTI can broadly be used as a reliability test for recent state-of-the-art language models, enabling researchers to debug their language models by analyzing the interpretation of their predictions.

To assess the validity of BTI for explanations, a parameter randomization test is conducted. In this test, the same input is processed twice by the BTI explainability method, utilizing random weights and by using the pre-trained weights.

FIG. 11 is an exemplary table 1100 illustrating a table including representative results for the parameter randomization test applied on the ITBS model. The table 1100, in this non-limiting examples, provides representative results for the parameter randomization test applied on BTI. The same paragraph-pair is processed twice by BTI. In the first application, BTI utilizes a backbone BERT model with random weights (a). In the second application, BTI employs the BERT model with the pre-trained weights (b).

The table 1100 in FIG. 11 exhibits a representative sample processed twice by BTI. In the first application, BTI is applied with a randomly initialized BERT network. In the second, BTI employs the pre-trained BERT weights. In the table 1100, the data shows that when BTI utilizes the pre-trained model, it produces semantically meaningful interpretations, and fails otherwise. Specifically, BTI utilizes BERT with random weights, identifies connectors, such as the word "and". The model fails by retrieving non important word-pairs, such as the words cuffs and pleat. For the same sample, BTI employing the prescribed weights of the pre-trained BERT model, identifies the important words that interpret the similarity between the two paragraphs, by retrieving the type of fabric (denim) and the type of clothing (T-shirt), that strongly correlate both paragraphs by marking the most important mutual characteristics.

As a baseline method, we consider an alternative to the word-pair scoring from the following equation:

$$\Lambda(w_i^1, w_j^2) := T(w_i^1) T(w_j^2) C(W(w_i^1), W(w_j^2))$$

where T and W are the TF-IDF scoring function and the word-to-vector mapping obtained by a pretrained word-to-vector (W2V) model, respectively. Hence, this method is referred to as "TF-IDF-W2V". We see that "Λ" incorporates both the general words importance (captured by TF-IDF scores) as well as their semantic relatedness (captured by W2V).

FIG. 12 is an exemplary table including match words with their word-pair scores. The table 1200 presents match-words together with their word-pair scores obtained by TF-IDF-W2V ((a),(c)) and BTI ((b),(d)), computed for two examples of sentence-pairs. The TF-IDF-W2V suggestions are limited to (camera, camera) and (nail, nail), which are trivial matches, whereas BTI further suggests (hammer, banging) and (man, someone), which are semantically related. In this example, BTI outperforms TF-IDFW2V since it utilizes the word-pair scoring which depends on the actual similarity score that is produced by BERT. This in contrast to TF-IDF-W2V that is completely independent of BERT internal mechanism and the similarity score.

FIG. 13 is an exemplary table 1300 including ablation study results for the ITBS model. The ablation Study data presented in table 1300, in this non-limiting example, is an ablation study for BTI on the fashion dataset. The following variants of BTI are considered: (i) utilizing the gradients and activations of the last BERT layer instead of the first one. (ii) using token-saliency scores based on the activation maps alone, and (iii) using scores solely based on gradients. The last two variants eliminate the Hadamard multiplication utilizing one variable at a time. To assess the performance of the ITBS model and compare it to the variants above, Interpretation scoring can be applied, using a 5-point-scale mean opinion score (MOS), conducted by five human judges to assess performance of the ITBS model and compare it to one or more variants. The same test set, comprising 100 samples, was ranked for all four variants (full method and three baselines). The scoring was performed blindly, and the samples were randomly shuffled. Each sample interpretation was ranked on a scale of 1 to 5, indicating poor to excellent performance. The results shown in table 1300 highlights the importance of utilizing the gradients on the embedding layer. Additionally, these results emphasize the importance of the multiplication between gradient and activations.

In other examples, the system performs BTI for interpreting the similarity between paragraph-pairs. Given a paragraph-pair, BTI identifies the important words that dictate the semantics of each paragraph, matches between the words from both elements, and retrieves the most influencing word-pairs that interpret the similarity between the paragraphs. This system has the ability to interpret contextualized embeddings generated by a pre-trained BERT model, by utilizing gradients calculated with respect to a cosine similarity function applied on BERT feature vectors.

Additionally, BTI is effective for explaining text-based similarity over a dataset of fashion items and show that BTI passes a reliability test, commonly used in the computer vision community, that estimates the reliability of explainability methods. BTI can be applied to various natural language tasks, such as explaining text-based item recommendations. BTI can expedite the research in the domain of language models by (1) identifying failure modes in transformer-based language models. (2) assessing the reliability of deployable language models (e.g., by obtaining trust in the underlying trained network). (3) analyzing the underlying dataset and learning about the data by interpreting the predictions made by well-trained language model.

In this manner, the system provides a technique for allowing a machine learning model to output portions it identifies as relevant to explain how another model is making decisions associated with pairs of text blocks. The system leverages the text-based similarity system propagating two paragraphs though the pre-trained language model to form contextual paragraph representations, then uses the output to perform the BTI method to extract meaningful information from item descriptions and highlight the most influential words in the input that explain the similarity between the items. The word-pairs assist in explaining why the underlying model concluded the recommendation was similar to the query (seed) item.

In some non-limiting examples, the system utilizes a base language model/backbone language model trained in the given domain. The backbone language model is able to understand semantics of a query (seed) item and match or score similarity between the query item with all other candidate items. This model finds the most important words in the input that may explain the similarity between the items.

ADDITIONAL EXAMPLES

Some aspects and examples disclosed herein are directed to a system, method and/or computer executable instructions for interpreting similarities between unlabeled paragraph pairs inferred by a pre-trained language model comprising: a processor; and a computer-readable medium storing instructions that are operative upon execution by the processor to calculate a set of gradients representing a first text-based paragraph describing a seed item and a second text-based paragraph describing a recommended item predicted to be similar to the seed item. The model generates contextualized embeddings based on the set of gradients and a similarity score measuring an affinity between the first text-based paragraph and the second text-based paragraph. A set of word-pairs are created based on the contextualized embeddings, the set of word-pairs comprising at least one word selected from the first text-based paragraph matched to a second word selected from the second text-based paragraph. The model selects a word-pair from the set of word-pairs having a word-pair score based on a threshold value. The word-pair score indicates a degree of influence exerted by the word-pair on selection of the recommended item from a plurality of candidate items.

In other examples, descriptive text-based paragraphs associated with items are fed into the ITBS model. The model obtains or generates features vectors representing the two input paragraphs. The ITBS model leverages feature vectors to calculate, iteratively, the gradience with respect to a function that maximizes the similarity between the features—in order to explain similarity score, compute the influence of any/each word of input on final decision of output. The system relates the original text/input into the recommendation model to the score predicted by the ITBS model to identify the words/tokens that had highest weight in impacting similarity scores generated by the recommendation model. The model encodes words with numbers to represent semantic meaning. The ITBS model algorithm takes these encoded semantic representations, and performs mathematical functions to determine similarity, then relate output to input with gradients, which informs users with regard to how recommendations were generated by the recommendation model.

Additional aspects and examples disclosed herein are directed to a system, method, or computer executable instructions for interpreting similarities between unlabeled paragraph pairs inferred by a pre-trained language model. An ITBS model is trained to calculate a set of gradients representing a first text-based paragraph describing a seed item and a second text-based paragraph describing a recommended item predicted to be similar to the seed item, the set of gradients calculated with respect to a cosine similarity function applied on a set of feature vectors. The ITBS model generates contextualized embeddings by propagating each paragraph through the pre-trained language model. A similarity score measuring an affinity between the first text-based paragraph and the second text-based paragraph. The ITBS model identifies a set of word-pairs based on the interpreted contextualized embeddings. The ITBS model selects a word-pair from the set of word-pairs having a highest word-pair score, the word-pair score indicating a degree of influence exerted by the word-pair on selection of the recommended item from a plurality of candidate items.

Additional aspects and examples disclosed herein are directed to a system, method and/or one or more computer storage devices having computer-executable instructions stored thereon for interpreting similarities between unlabeled paragraph pairs inferred by a pre-trained language model, which, on execution by a computer, cause the computer to perform operations comprising: calculating a set of gradients representing a first text-based paragraph describing a seed item and a second text-based paragraph describing a recommended item predicted to be similar to the seed item; interpreting contextualized embeddings generated by the pre-trained language model utilizing the set of gradients and a similarity score measuring an affinity between the first text-based paragraph and the second text-based paragraph; identifying a set of word-pairs based on the interpreted contextualized embeddings; and selecting a word-pair from the set of word-pairs having a highest word-pair score, the word-pair score indicating a degree of influence exerted by the word-pair on selection of the recommended item from a plurality of candidate items.

In some examples, the system provides an ITBS model employing a BTI method for interpreting paragraphs similarity, in unlabeled settings. The system enables a user to evaluate BTI and showcase its performance in interpreting text-based item similarity in a cold fashion catalog.

The system can assist a user in relating the original text and input into a recommendation model to a calculated score to explain the recommendation/prediction generated based on the input and score. The system identifies which words in the input were most important with respect to the generated prediction that the seed item and recommended items match and/or are similar (two products go together) based on the natural language text descriptions for the items. The system uses the input and score to calculate gradient map to identify words/tokens having the highest weight. The same functions that scores similarity between items can be used to go backward and find the most important words that made the model think the two items are similar. The system calculates gradients backward using the input. The system assumes that if two paragraphs (pieces of text) are similar, the system can find important words in both textual descriptions that dictate semantics of each piece of text that also have high similarity between them and relevance to the prediction.

The system, in some examples, gives a greater weight to words that have greater importance with regard to describing characteristics or properties of an item. For example, if an item is wine, words such as delicious, great taste, pleasant, and other subjective descriptor may be disregarded or afforded a lower weight due to their inability to assist in matching different items. Other terms describing more salient features, such as red, white, dry, sweet, etc., are afforded a higher weight because they have greater relevance in determining whether one type of wine is similar to another type of wine.

In another example, the system generates word-pairs by matching words that have the same or similar semantic meaning even if the words are different. For example, if two items both have the word "lemon" in the description, those terms can be matched in a word-pair as similar because the words are the same and likely have the same meaning in the context of items from the same domain. However, if one item description includes the word "citrus" and another includes the word "lemon", these items can still be matched based on the similar meaning even though the words themselves are different.

In another example scenario, if the recommendation model generates a recommended item which is a red dress matched to a seed item which is a blue dress, the system analyzes the descriptions for both items to determine which words in both descriptions led to the prediction that the blue dress and the red dress are similar (match). In this example, words indicating similarity in type of fabric, waistline, collar, length of skirt, etc., may be used to determine why the two dresses were matched together by the BERT model.

The word-pairs generated by the system can be used to improve/fine-tune the recommendation models, as well as improving user understanding of how the recommendations were generated by the model. Likewise, the system can also be used to improve decision making when we see model explanation is not a good one. For example, if a word-pair indicates two items were matched based on a weak, insignificant, or unreliable criteria, the user can provide feedback to eliminate use of this criteria by the model in future. In this way, the model is improved over time to generate more accurate and reliable results.

In a non-limiting example scenario, a seed item pair of gloves description includes the following text "Fine-knit gloves in soft fabric with ribbed cuffs. Tops of thumb, index, and middle fingers in touchscreen-compatible fabric." The seed item is from a fashion catalog of clothing and garments. The recommendation model generates a recommended item that is another pair of gloves having the following description "Running gloves with uppers in windproof functional fabric. Wide ribbing at cuffs, printed reflective detail at top, and small key pocket at back of one glove with concealed zip. Top of thumb and index finger made from smartphone-friendly material. Unlined." The ITBS model analyzes the seed item description paragraph and the recommended item description paragraph to determine why the recommendation model predicted the second pair of gloves as an item similar/matching the seed item. In this example, the system identifies the first word-pair including the word "glove" in the seed item description and the same word "glove" in the recommended item description. This word-pair likely had a great weight in determining item similarity scores for these two items. A second word-pair identified by the system includes a word "touchscreen compatible" obtained from the seed item description and the different, but similar words "smartphone-friendly" in the recommended item description. Although these words are different, they carry similar contextual meaning and would likely have held great weight in determining whether these two items were similar.

In another example scenario, a seed item description includes the following text "Softshell jacket in windproof, water-repellent functional fabric with a zip at front. Hood with elastic drawstring and small visor. Chest pocket with zip and media outlet inside, side pockets with zip, and elasticized cuffs and hem. Thermal fleece inside. Regular fit. Size of chest pocket approx. 4¾×6¾ in." A recommended item description states "Padded jacket in fast-drying, functional fabric with seamless quilting to provide extra protection from cold air. Stand-up collar, hood with elastic drawstring, and zip at front. Side pockets with zip and an inner pocket. Lined." The system identifies a first matching word-pair having a high word-pair score includes the word "jacket" from the seed item description and the same word "jacket" in the recommended item description. This word-pair is weighted higher/scored higher than other word-pairs because this is the same word and it has the same contextual meaning in this situation. Another word-pair includes the word "water-repellant" in the seed item description and the word "fast-drying" in the recommended item description. These are different words, but they have similar contextual meaning and are afforded a higher weighting/score. A third word-pair in this example includes the word "softshell" in the seed item description and the word "padded" in the recommended item description. These words are different but their contextual meaning is somewhat similar, as they both refer to padding or softness of the jackets. This word-pair is afforded a slightly lower weighting/score than the other two word-pairs indicating this word-pair is significant, but perhaps not the closest/best word-pair.

Alternatively, or in addition to the other examples described herein, examples include any combination of the following:
- analyze the first text-based paragraph by a token saliency component, wherein the token saliency component generates a first set of gradients associated with the first text-based paragraph;
- analyze the second text-based paragraph by the token saliency component, wherein the token saliency component generates a second set of gradients associated with the second text-based paragraph;
- identify a word-pair from the set of word-pairs having a word-pair score exceeding a threshold value;
- identify a word-pair from the set of word-pairs having a highest weight, wherein the identified word-pair having the highest weight is selected;
- scale at least one gradient map by a multiplication with the corresponding activation maps and summed across the feature dimensions to produce one or more saliency score(s) for every token associated with a selected paragraph;
- maximize the similarity score between the aggregated latent representation of a matched word associated with a description of the recommended item and a word associated with a description of the seed item; and
- aggregate token saliency scores associated with at least one word in an item description to generate word-scores.

While the aspects of the disclosure have been described in terms of various examples with their associated operations, a person skilled in the art would appreciate that a combination of operations from any number of different examples is also within scope of the aspects of the disclosure.

Example Operating Environment

Figure 14:
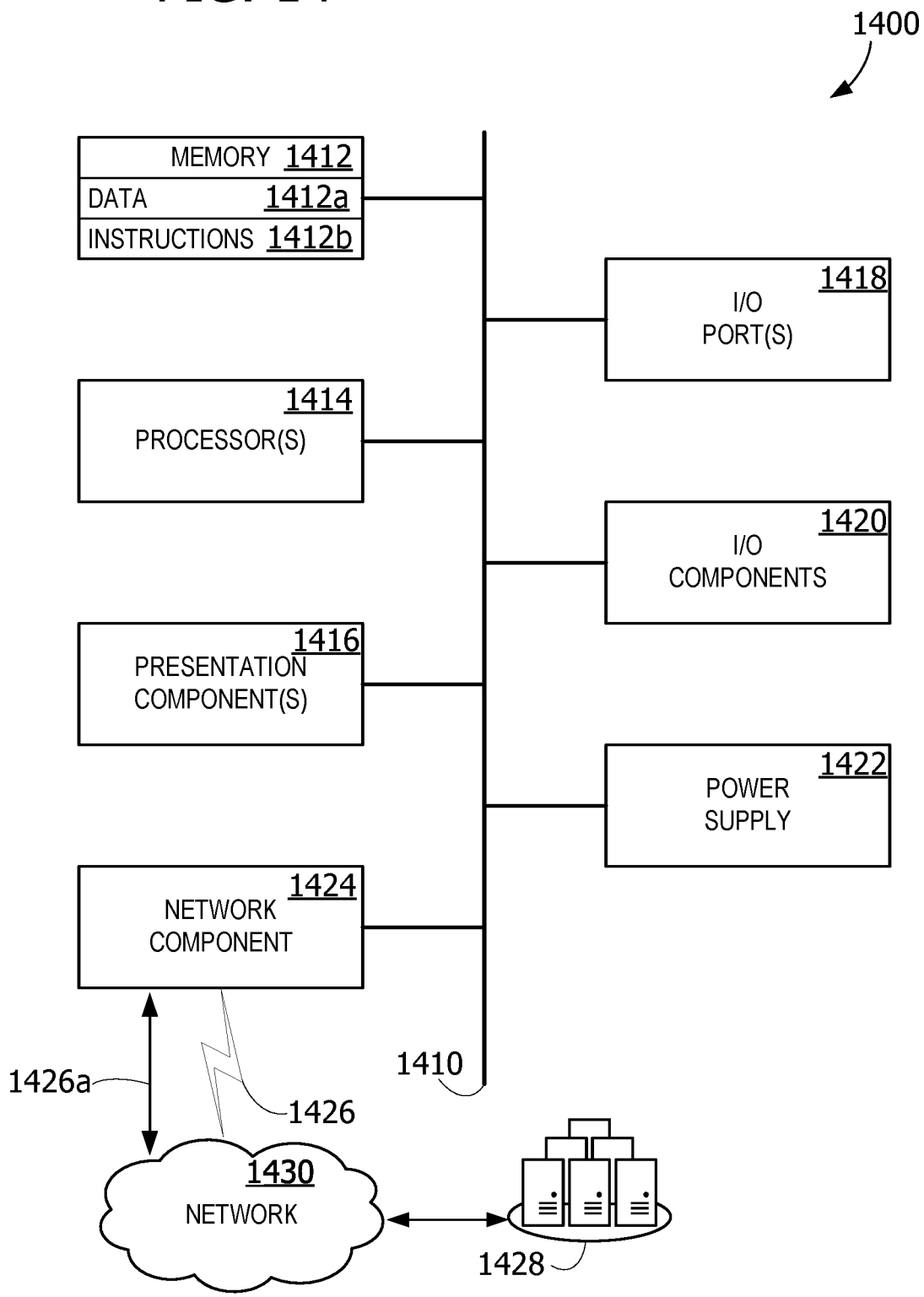
FIG. 14 is exemplary block diagram illustrating an example computing environment suitable for implementing some of the various examples disclosed herein.

FIG. 14 is a block diagram of an example computing device 1400 for implementing aspects disclosed herein and is designated generally as computing device 1400. The computing device 1400 is a computing device, such as, but not limited to, the user device 136 in FIG. 1 and/or the computing device 202 in FIG. 2. Computing device 1400 is an example of a suitable computing environment and is not intended to suggest any limitation as to the scope of use or functionality of the examples disclosed herein. Neither should computing device 1400 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device.

Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1400 includes a bus 1410 that directly or indirectly couples the following devices: computer-storage memory 1412, one or more processors 1414, one or more presentation components 1416, I/O ports 1418, I/O components 1420, a power supply 1422, and a network component 1424. While computing device 1400 is depicted as a seemingly single device, multiple computing devices 1400 may work together and share the depicted device resources. For example, memory 1412 may be distributed across multiple devices, and processor(s) 1414 may be housed with different devices.

Bus 1410 represents what may be one or more busses (such as an address bus, data bus, or a combination thereof). Although the various blocks of FIG. 14 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 14 and the references herein to a "computing device."

Memory 1412 may take the form of the computer-storage media references below and operatively provide storage of computer-readable instructions, data structures, program modules and other data for computing device 1400. In some examples, memory 1412 stores one or more of an operating system, a universal application platform, or other program modules and program data. Memory 1412 is thus able to store and access data 1412a and instructions 1412b that are executable by processor 1414 and configured to carry out the various operations disclosed herein.

In some examples, memory 1412 includes computer-storage media in the form of volatile and/or nonvolatile memory, removable or non-removable memory, data disks in virtual environments, or a combination thereof. Memory 1412 may include any quantity of memory associated with or accessible by computing device 1400. Memory 1412 may be internal to computing device 1400 (as shown in FIG. 14), external to computing device 1400 (not shown), or both (not shown).

Examples of memory 1412 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 1400. Additionally, or alternatively, memory 1412 may be distributed across multiple computing devices 1400, for example, in a virtualized environment in which instruction processing is carried out on multiple computing devices 1400. For the purposes of this disclosure, "computer storage media," "computer storage device", "computer-storage memory," "memory," and "memory devices" are synonymous terms for computer-storage memory 1412, and none of these terms include carrier waves or propagating signaling.

Processor(s) 1414 may include any quantity of processing units that read data from various entities, such as memory 1412 or I/O components 1420 and may include CPUs and/or GPUs. Specifically, processor(s) 1414 are programmed to execute computer-executable instructions for implementing aspects of the disclosure. The instructions may be performed by the processor, by multiple processors within computing device 1400, or by a processor external to client computing device 1400. In some examples, processor(s) 1414 are programmed to execute instructions such as those illustrated in the in the accompanying drawings.

Moreover, in some examples, processor(s) 1414 represent an implementation of analog techniques to perform the operations described herein. For example, the operations may be performed by an analog client computing device 1400 and/or a digital client computing device 1400. Presentation component(s) 1416 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1400, across a wired connection, or in other ways. I/O ports 1618 allow computing device 1400 to be logically coupled to other devices including I/O components 1420, some of which may be built in. Example I/O components 1420 include, for example but without limitation, a microphone, joystick, game pad, satellite dish, scanner, printer, wireless device, etc.

Computing device 1400 may operate in a networked environment via network component 1424 using logical connections to one or more remote computers. In some examples, network component 1424 includes a network interface card and/or computer-executable instructions (e.g., a driver) for operating the network interface card. Communication between computing device 1400 and other devices may occur using any protocol or mechanism over any wired or wireless connection.

In some examples, network component 1424 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1424 communicates over wireless communication link 1426 and/or a wired communication link 1426*a* to a cloud resource 1428 across network 1430. Various different examples of communication links 1426 and 1426*a* include a wireless connection, a wired connection, and/or a dedicated link, and in some examples, at least a portion is routed through the internet.

Although described in connection with an example computing device 1400, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types.

Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a memory comprising computer-readable instructions, the memory and the computer-readable instructions configured to, with the processor, implement a pre-trained interpreting text-based similarity (ITBS) model, to cause the processor to:
   calculate a set of gradients representing a first unlabeled text-based paragraph describing a seed item and a second unlabeled text-based paragraph describing a recommended item predicted to be similar to the seed item, the set of gradients calculated with respect to a cosine similarity function applied on a set of feature vectors, the set of feature vectors comprising a first feature vector representing the first unlabeled text-based paragraph and a second feature vector representing the second unlabeled text-based paragraph, wherein the first unlabeled text-based paragraph and the second unlabeled text-based paragraph comprise an unlabeled paragraph pair;
   generate contextualized embeddings based on the set of gradients and a similarity score measuring an affinity between the first unlabeled text-based paragraph and the second unlabeled text-based paragraph, wherein generating the contextualized embeddings includes:
   tokenizing the first unlabeled text-based paragraph and the second unlabeled text-based paragraph;
   generating a saliency score for each token in the first unlabeled text-based paragraph and for each token in the second unlabeled text-based paragraph, wherein the saliency score is associated with at least one word in an item description;
   aggregating the token saliency scores of the first unlabeled text-based paragraph to generate word-scores for the first unlabeled text-based paragraph;
   aggregating the token saliency scores of the second unlabeled text-based paragraph to generate word-scores for the second unlabeled text-based paragraph;
   matching words from the first unlabeled text-based paragraph and the second unlabeled text-based paragraph based on the similarity score to generate a set of word-pairs, each word-pair in the set of word-pairs comprising a first word selected from the first unlabeled text-based paragraph matched to a second word selected from the second unlabeled text-based paragraph, wherein the first word and the second word have a similar semantic meaning; and
   scoring each word-pair using the generated word-scores of the aggregated token saliency scores for both the first unlabeled text-based paragraph and the second unlabeled text-based paragraph to generate a word-pair score, the word-pair score indicating a degree of influence exerted by an individual word-pair on selection of the recommended item from a plurality of candidate items;
   select a word-pair from the set of word-pairs based on the word-pair score and a threshold value; and
   interpret, based on the selected word-pair, a recommendation generated by a recommendation model.

2. The system of claim 1, wherein the instructions are further operative to:
   analyze the first unlabeled text-based paragraph by a token saliency component, wherein the token saliency component generates a first set of gradients associated with the first unlabeled text-based paragraph; and
   analyze the second unlabeled text-based paragraph by the token saliency component, wherein the token saliency component generates a second set of gradients associated with the second unlabeled text-based paragraph.

3. The system of claim 1, wherein the instructions are further operative to:
   identify the word-pair from the set of word-pairs having the word-pair score exceeding the threshold value.

4. The system of claim 1, wherein the instructions are further operative to:
   identify the word-pair from the set of word-pairs having a highest weight for selection.

5. The system of claim 1, wherein the instructions are further operative to:
   scale at least one gradient map by a multiplication with corresponding activation maps and summed across one or more feature vectors to produce one or more saliency score(s) for every token associated with a selected paragraph.

6. The system of claim 1, wherein the instructions are further operative to:
   maximize the similarity score between an aggregated latent representation of a matched word associated with a description of the recommended item and a word associated with a description of the seed item.

7. The system of claim 1, wherein the pre-trained interpreting text-based similarity (ITBS) model is trained on a domain-specific corpus to provide a specialized model trained to make recommendations within a selected domain.

8. A method comprising:
   calculating a set of gradients representing a first unlabeled text-based paragraph describing a seed item and a second unlabeled text-based paragraph describing a recommended item predicted to be similar to the seed item, the set of gradients calculated with respect to a cosine similarity function applied on a set of feature vectors, the set of feature vectors comprising a first feature vector representing the first unlabeled text-based paragraph and a second feature vector representing the second unlabeled text-based paragraph, wherein the first unlabeled text-based paragraph and the second unlabeled text-based paragraph comprise an unlabeled paragraph pair;
generating contextualized embeddings based on the set of gradients and a similarity score measuring an affinity between the first unlabeled text-based paragraph and the second unlabeled text-based paragraph, wherein generating the contextualized embeddings includes:
tokenizing the first unlabeled text-based paragraph and the second unlabeled text-based paragraph;
generating a saliency score for each token in the first unlabeled text-based paragraph and for each token in the second unlabeled text-based paragraph, wherein the saliency score is associated with at least one word in an item description; and
aggregating the token saliency scores of the first unlabeled text-based paragraph to generate word-scores for the first unlabeled text-based paragraph;
aggregating the token saliency scores of the second unlabeled text-based paragraph to generate word-scores for the second unlabeled text-based paragraph;
matching words from the first unlabeled text-based paragraph and the second unlabeled text-based paragraph based on the similarity score to generate a set of word-pairs, each word-pair in the set of word-pairs comprising a first word selected from the first unlabeled text-based paragraph matched to a second word selected from the second unlabeled text-based paragraph, wherein the first word and the second word have a similar semantic meaning; and
scoring each word-pair using the generated word-scores of the aggregated token saliency scores for both the first unlabeled text-based paragraph and the second unlabeled text-based paragraph to generate a word-pair score, the word-pair score indicating a degree of influence exerted by an individual word-pair on selection of the recommended item from a plurality of candidate items;
selecting a word-pair from the set of word-pairs based on the word-pair score and a threshold value; and
interpreting, based on the selected word-pair, a recommendation generated by a recommendation model.

9. The method of claim 8, further comprising:
analyzing the first unlabeled text-based paragraph by a token saliency component, wherein the token saliency component generates a first set of gradients associated with the first unlabeled text-based paragraph; and
analyzing the second unlabeled text-based paragraph by the token saliency component, wherein the token saliency component generates a second set of gradients associated with the second unlabeled text-based paragraph.

10. The method of claim 8, further comprising:
identifying the word-pair from the set of word-pairs having the word-pair score exceeding a threshold value.

11. The method of claim 8, further comprising:
identifying the word-pair from the set of word-pairs having a highest weight for selection.

12. The method of claim 8, further comprising:
scaling at least one gradient map by a multiplication with corresponding activation maps and summed across one or more feature vectors to produce one or more saliency score(s) for every token associated with a selected paragraph.

13. The method of claim 8, further comprising:
maximizing the similarity score between an aggregated latent representation of a matched word associated with a description of the recommended item and a word associated with a description of the seed item.

14. The method of claim 8, wherein the pre-trained interpreting text-based similarity (ITBS) model is trained on a domain-specific corpus to provide a specialized model trained to make recommendations within a selected domain.

15. One or more computer storage devices having computer-executable instructions stored thereon for interpreting similarities between unlabeled paragraph pairs inferred by a pre-trained language model, which, on execution by a computer, cause the computer to perform operations comprising:
calculate a set of gradients representing a first unlabeled text-based paragraph describing a seed item and a second unlabeled text-based paragraph describing a recommended item predicted to be similar to the seed item, the set of gradients calculated with respect to a cosine similarity function applied on a set of feature vectors, the set of feature vectors comprising a first feature vector representing the first unlabeled text-based paragraph and a second feature vector representing the second unlabeled text-based paragraph, wherein the first unlabeled text-based paragraph and the second unlabeled text-based paragraph comprise an unlabeled paragraph pair;
generate contextualized embeddings based on the set of gradients and a similarity score measuring an affinity between the first unlabeled text-based paragraph and the second unlabeled text-based paragraph, wherein generating the contextualized embeddings includes:
tokenizing the first unlabeled text-based paragraph and the second unlabeled text-based paragraph;
generating a saliency score for each token in the first unlabeled text-based paragraph and for each token in the second unlabeled text-based paragraph, wherein the saliency score is associated with at least one word in an item description; and
aggregating the token saliency scores of the first unlabeled text-based paragraph to generate word-scores for the first unlabeled text-based paragraph;
aggregating the token saliency scores of the second unlabeled text-based paragraph to generate word-scores for the second unlabeled text-based paragraph;
matching words from the first unlabeled text-based paragraph and the second unlabeled text-based paragraph based on the similarity score to generate a set of word-pairs, each word-pair in the set of word-pairs comprising a first word selected from the first unlabeled text-based paragraph matched to a second word selected from the second unlabeled text-based paragraph, wherein the first word and the second word have a similar semantic meaning; and
scoring each word-pair using the generated word-scores of the aggregated token saliency scores for both the first unlabeled text-based paragraph and the second unlabeled text-based paragraph to generate a word-pair score, the word-pair score indicating a degree of influence exerted by an individual word-pair on selection of the recommended item from a plurality of candidate items;
selecting a word-pair from the set of word-pairs based on the word-pair score and a threshold value; and
interpreting, based on the selected word-pair, a recommendation generated by a recommendation model.

16. The one or more computer storage devices of claim 15, wherein the operations further comprise:
- analyze the first unlabeled text-based paragraph by a token saliency component, wherein the token saliency component generates a first set of gradients associated with the first unlabeled text-based paragraph; and
- analyze the second unlabeled text-based paragraph by the token saliency component, wherein the token saliency component generates a second set of gradients associated with the second unlabeled text-based paragraph.

17. The one or more computer storage devices of claim 15, wherein the operations further comprise:
- identify the word-pair from the set of word-pairs having the word-pair score exceeding a threshold value.

18. The one or more computer storage devices of claim 15, wherein the operations further comprise:
- identify the word-pair from the set of word-pairs having a highest weight for selection.

19. The one or more computer storage devices of claim 15, wherein the operations further comprise:
- scale at least one gradient map by a multiplication with corresponding activation maps and summed across one or more feature vectors to produce one or more saliency score(s) for every token associated with a selected paragraph.

20. The one or more computer storage devices of claim 15, wherein the pre-trained interpreting text-based similarity (ITBS) model is trained on a domain-specific corpus to provide a specialized model trained to make recommendations within a selected domain.

* * * * *